US010107545B2

(12) United States Patent
Morishita et al.

(10) Patent No.: US 10,107,545 B2
(45) Date of Patent: Oct. 23, 2018

(54) AIR-CONDITIONING APPARATUS FOR VEHICLE

(71) Applicant: MITSUBISHI HEAVY INDUSTRIES AUTOMOTIVE THERMAL SYSTEMS CO., LTD., Kiyosu-shi, Aichi (JP)

(72) Inventors: Masatoshi Morishita, Kiyosu (JP); Toshihisa Kondo, Kiyosu (JP); Akira Katayama, Kiyosu (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 691 days.

(21) Appl. No.: 14/351,982

(22) PCT Filed: Dec. 7, 2012

(86) PCT No.: PCT/JP2012/007858
§ 371 (c)(1),
(2) Date: Apr. 15, 2014

(87) PCT Pub. No.: WO2013/094144
PCT Pub. Date: Jun. 27, 2013

(65) Prior Publication Data
US 2014/0298838 A1    Oct. 9, 2014

(30) Foreign Application Priority Data

Dec. 22, 2011   (JP) .................................. 2011-280955

(51) Int. Cl.
*F25D 21/00*   (2006.01)
*B60H 1/32*    (2006.01)
(Continued)

(52) U.S. Cl.
CPC ....... *F25D 21/004* (2013.01); *B60H 1/00921* (2013.01); *B60H 1/321* (2013.01);
(Continued)

(58) Field of Classification Search
CPC ........ B60H 1/321; B60H 1/785; B60H 1/907; B60H 2001/949; B60H 2001/00107;
(Continued)

(56) References Cited

U.S. PATENT DOCUMENTS 6,164,367 A     12/2000  Kurahashi et al.
6,347,528 B1 *   2/2002  Iritani ................ B60H 1/00357
                                                       62/323.1
(Continued)

FOREIGN PATENT DOCUMENTS

FR        2960628 A1 * 12/2011 ............. B60H 1/321
JP        10-114214 A    5/1998
(Continued)

OTHER PUBLICATIONS

Supplementary European Search Report dated Jul. 16, 2015, issued in counterpart application No. EP 12858701.1. (8 pages).
(Continued)

*Primary Examiner* — Frantz Jules
*Assistant Examiner* — Lionel Nouketcha
(74) *Attorney, Agent, or Firm* — Westerman, Hattori, Daniels & Adrian, LLP

(57) ABSTRACT

An air conditioning apparatus for a vehicle includes a refrigerant heater 41 that is provided between an internal evaporator 8 and a suction side of an electric compressor 20 to be in parallel with an external evaporator 32, and heats a refrigerant which is suctioned into the electric compressor 20; and an air conditioning control apparatus 50 that determines whether the external evaporator 32 is frosted. While the air conditioning apparatus for a vehicle operates in a
(Continued)

heating mode, when the air conditioning control apparatus 50 determines that the external evaporator 32 is frosted, a supply of the refrigerant subject to the heat exchange in an internal condenser 9 to the external evaporator 32 is stopped, and the refrigerant is supplied to the refrigerant heater 41, is heated and then, is suctioned into the electric compressor 20.

11 Claims, 15 Drawing Sheets

(51) Int. Cl.
| | | |
|---|---|---|
| *B60H 1/00* | (2006.01) | |
| *F25B 5/02* | (2006.01) | |
| *F25B 47/02* | (2006.01) | |
| *F25B 6/02* | (2006.01) | |
| *F25B 1/00* | (2006.01) | |

(52) U.S. Cl.
CPC ...... *B60H 2001/00949* (2013.01); *F25B 1/00* (2013.01); *F25B 5/02* (2013.01); *F25B 6/02* (2013.01); *F25B 47/02* (2013.01); *F25B 47/022* (2013.01)

(58) Field of Classification Search
CPC ...... B60H 1/00785; B60H 2001/00949; F25B 2700/11; F25B 1/00; F25B 47/02; F25B 47/022; F25B 5/02; F25B 6/02; F25D 21/004

See application file for complete search history.

(56) References Cited

U.S. PATENT DOCUMENTS

| | | | | |
|---|---|---|---|---|
| 2006/0218964 | A1* | 10/2006 | Saito | B60H 1/3211 62/500 |
| 2007/0283717 | A1* | 12/2007 | Hirota | F25B 41/062 62/527 |

FOREIGN PATENT DOCUMENTS

| | | | | |
|---|---|---|---|---|
| JP | 2004-182110 | A | 7/2004 | |
| JP | 2010-111222 | A | 5/2010 | |
| JP | 2010-234847 | A | 10/2010 | |
| JP | 2010-236709 | A | 10/2010 | |
| JP | 2010234847 | A * | 10/2010 | ......... B60H 1/00921 |
| JP | 2011-240756 | A | 12/2011 | |
| JP | 2011-255734 | A | 12/2011 | |

OTHER PUBLICATIONS

International Search Report for PCT/JP2012/007858, dated Mar. 12, 2013.

* cited by examiner

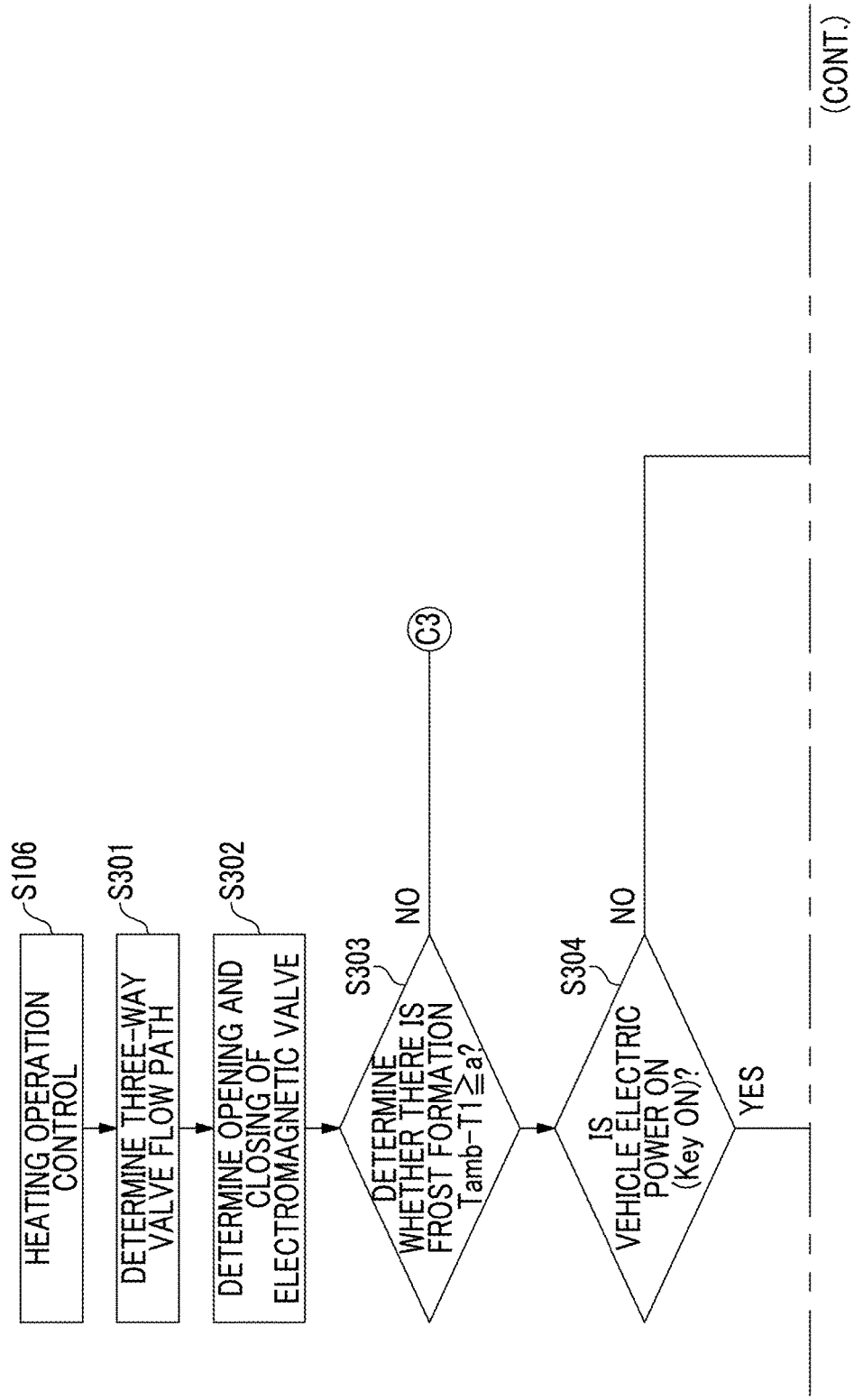

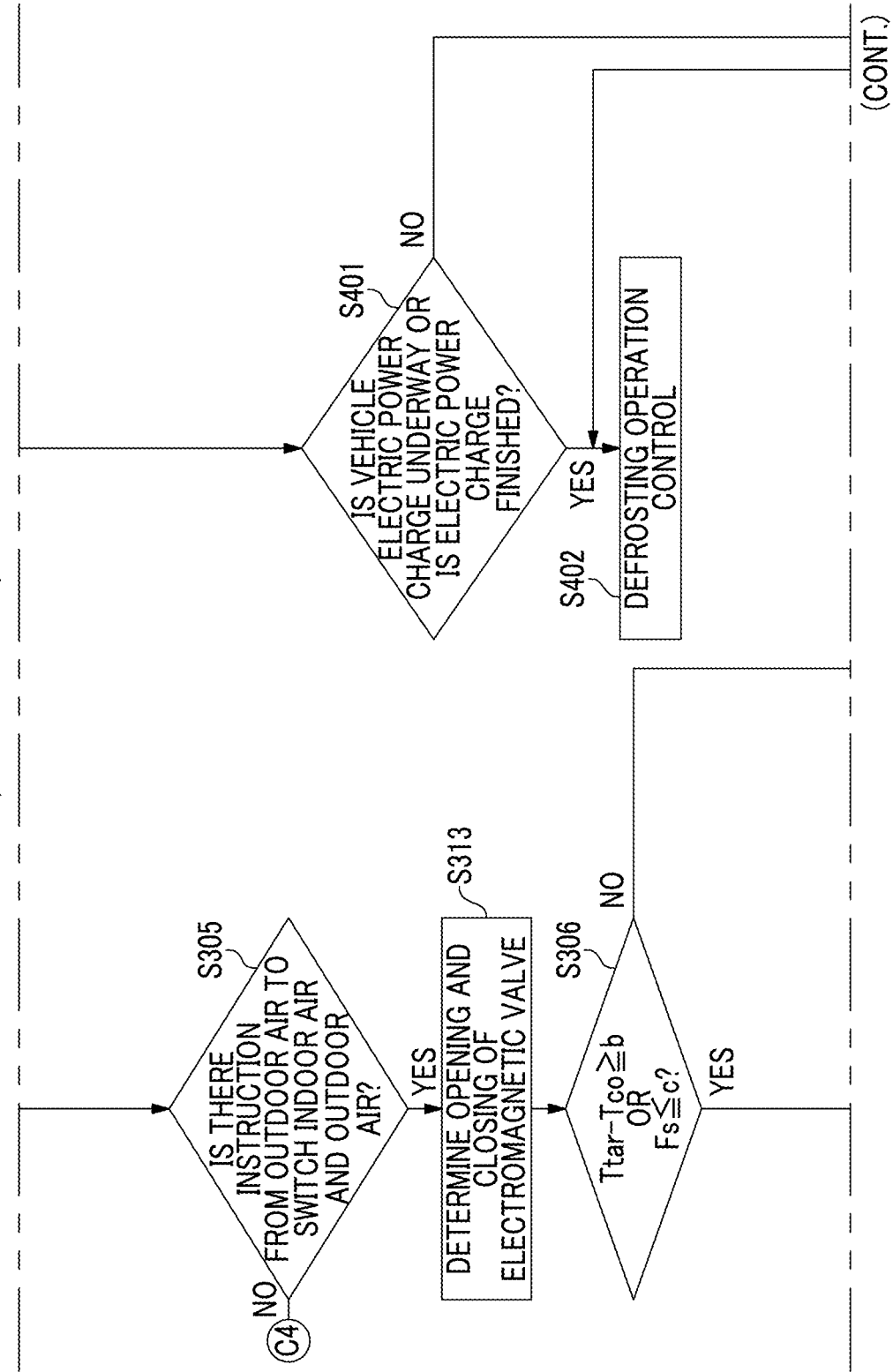

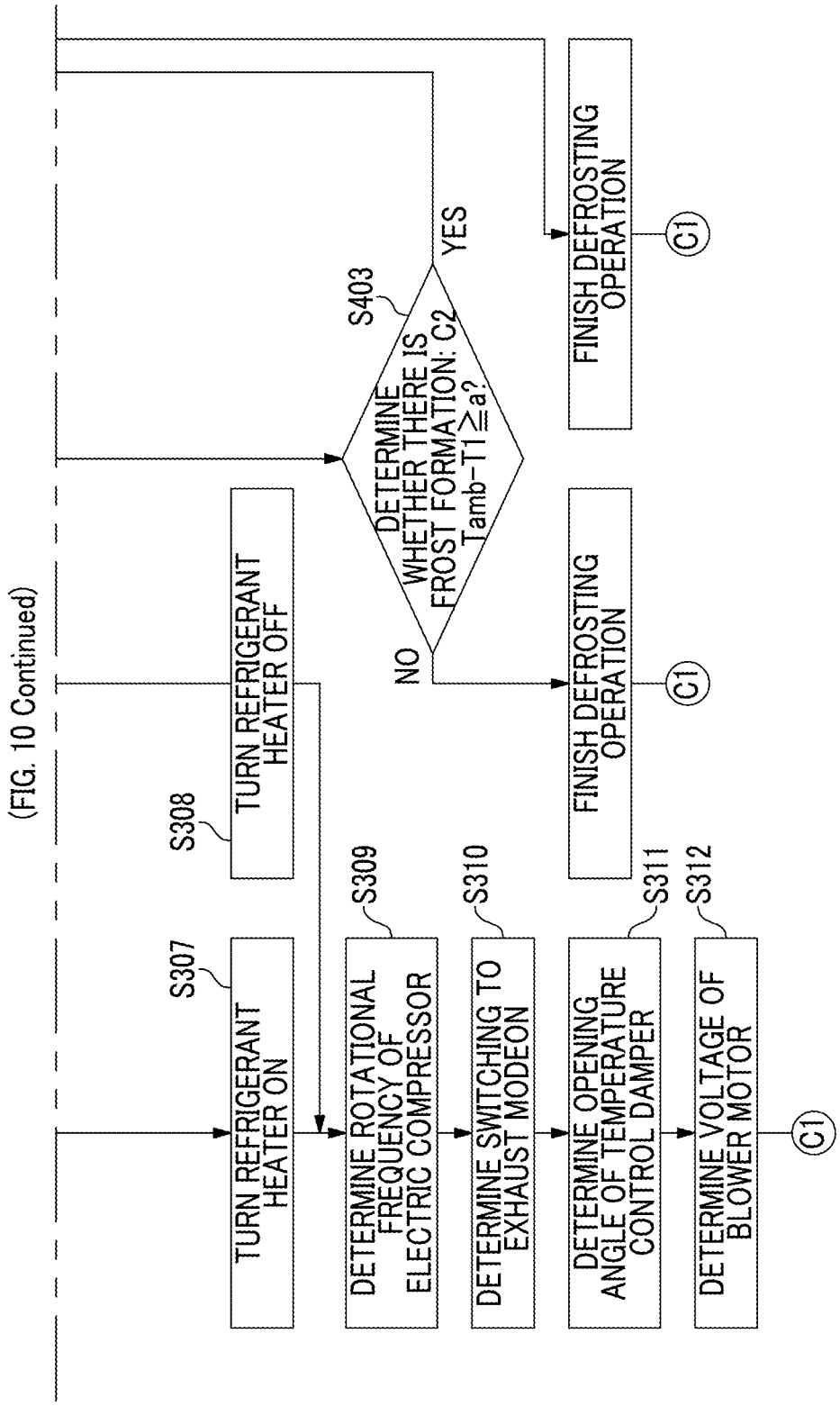

AIR-CONDITIONING APPARATUS FOR VEHICLE

TECHNICAL FIELD

The present invention relates to a heat pump type air conditioning apparatus for a vehicle that is applicable to an air conditioning apparatus of an electric vehicle, a hybrid vehicle or the like, and to a defrosting method of the apparatus.

BACKGROUND ART

In an air conditioning apparatus for a vehicle which is applicable to an electric vehicle, a hybrid vehicle or the like, a heating operation cannot be performed by using combustion exhaust heat such as an engine coolant. The air conditioning apparatus can use exhaust heat from a traction motor or a battery in replacement of an engine, but since the amount of the exhaust heat is small, a heating system cannot operate with only the exhaust heat as a heat source. Even in the hybrid vehicle, an engine is controlled not to run as much as possible due to fuel saving and thus, it is intended that the hybrid vehicle adopts a heat pump heating system using a refrigerant or an electric heater heating system using a coolant as a refrigerant. Power is significantly consumed to perform a heating operation and thus, it is desirable to adopt the heat pump system that is a high COP heating system (the COP of the electric heater≤1). However, when the heat pump heating system operates at a low outside temperature (for example, −10° C.), there is a possibility that moisture in air condenses, frost formation occurs in a heat exchanger disposed on the outside of a cabin and thus, heating performance deteriorates.

For example, when frost formation occurs in an external heat exchanger for a domestic room air conditioner, a so-called reverse operation (a heating operation switched to a cooling operation) is performed, and the external heat exchanger is defrosted. However, when the heat pump system for a vehicle is defrosted in the same way, it is assumed that when a heating operation stops, a visual field cannot be ensured, that is, a safety standard cannot be met.

In this point, PTL 1 discloses a circuit in which when the external heat exchanger frosts in a low ambient air temperature range, the external heat exchanger and an internal heat exchanger are disposed in parallel with each other, a part of a heating gas discharged from a compressor detours to the external heat exchanger (evaporator), the refrigerant is allowed to flow into the internal heat exchanger as well and thus, a heating operation is continuously performed together with a defrosting operation. In this circuit, a refrigerant heater compensates for deficient heat that cannot be absorbed by the external heat exchanger (the evaporator) and thus, necessary heating performance is ensured.

CITATION LIST

Patent Literature

[PTL 1] Japanese Unexamined Patent Application Publication No. 2010-236709

SUMMARY OF INVENTION

Technical Problem

However, according to PTL 1, since while a vehicle is travelling, power charged in a battery is consumed to perform the defrosting operation, the vehicle can travel a short distance.

The present invention is made in light of the problem, and an object of the present invention is to provide an air conditioning apparatus for a vehicle which can prevent power of a battery from being consumed to perform a defrosting operation while a vehicle is travelling, and can continuously perform a heating operation even though an external heat exchanger is frosted.

Solution to Problem

A heat pump type air conditioning apparatus for a vehicle according to the present invention made in light of the problems. The air conditioning apparatus for a vehicle operates while switching an operation mode between a cooling operation in which a refrigerant discharged from a compressor is subject to heat exchange in an external condenser, and then is depressurized and supplied to an internal evaporator and a heating operation in which the refrigerant discharged from the compressor is subject to heat exchange in an internal condenser, and then is depressurized and supplied to an external evaporator.

In the air conditioning apparatus for a vehicle, a refrigerant heater is provided between the internal evaporator and a suction side of the compressor. The refrigerant heater is provided in parallel with the external evaporator, and heats the refrigerant which is suctioned into the compressor. The air conditioning apparatus for a vehicle includes a frost formation determination unit that determines whether the external evaporator is frosted.

When the frost formation determination unit determines that the external evaporator is frosted during the heating operation, a supply of the refrigerant subject to the heat exchange in the internal condenser to the external evaporator is stopped, and the refrigerant is supplied to the refrigerant heater, is heated and then, is suctioned into the compressor.

In the air conditioning apparatus for a vehicle according to the present invention, when the frost formation determination unit determines that the external evaporator is frosted, a supply of the refrigerant subject to the heat exchange in the internal condenser to the external evaporator is stopped, and the refrigerant is supplied to the refrigerant heater, is heated and then, is suctioned into the compressor. Accordingly, it is possible to prevent power of a battery from being consumed to perform a defrosting operation while the vehicle is travelling, and to continuously perform the heating operation even though the external evaporator is frosted.

The air conditioning apparatus for a vehicle according to the present invention further includes a first thermostatic expansion valve that is provided between the internal condenser and the external evaporator; and a second thermostatic expansion valve that is provided between the internal condenser and the refrigerant heater. Opening angles of the first and the second thermostatic expansion valves are controlled in conjunction with an operation of the refrigerant heater and thus, a flow path of the refrigerant can be specified. As such, when the thermostatic expansion valves are used, it is possible to reduce costs for controlling the expansion valves.

In the air conditioning apparatus for a vehicle according to the present invention, while the frost formation determination unit determines that the external evaporator is not frosted, a heating operation can be performed in a cycle in which the refrigerant discharged from the compressor dissipates heat in the internal condenser, is depressurized, absorbs heat in the external evaporator, and then is suctioned into the compressor.

In contrast, while the frost formation determination unit determines that the external evaporator is frosted, an operation can be performed in a cycle in which the refrigerant discharged from the compressor dissipates heat in the internal condenser, is depressurized, absorbs heat in the internal evaporator, is heated in the refrigerant heater, and then is suctioned into the compressor. That is, while it is determined that the external evaporator is frosted, a dehumidification and heating operation is performed in a mode in which inside air (air in a cabin) circulates in the system.

Alternatively, the air conditioning apparatus for a vehicle can perform a heating operation in an outside air introduction mode in which the refrigerant discharged from the compressor dissipates heat in the internal condenser, is heated in the refrigerant heater that is a heat source, and then is suctioned into the compressor.

For example, an operation mode can be determined based on whether there is an instruction from an occupant to introduce outside air.

In the air conditioning apparatus for a vehicle according to the present invention, while it is determined that the external evaporator is frosted, in a state where the vehicle stops and the occupant is not in the vehicle, while a battery of the vehicle is being charged or when the battery has spare capacity, the internal evaporator is defrosted.

In the air conditioning apparatus for a vehicle according to the present invention, the second thermostatic expansion valve includes a first passage with a pressure reduction mechanism and a second passage without a pressure reduction mechanism. A pipe passage is preferably configured in such a manner that the refrigerant flowing out of the refrigerant heater is suctioned into the compressor via the second passage.

Advantageous Effects of Invention

The present invention provides the air conditioning apparatus for a vehicle which can prevent the power of the battery from being consumed to perform the defrosting operation while a vehicle is travelling, and can continuously perform the heating operation even though the external heat exchanger is frosted.

BRIEF DESCRIPTION OF DRAWINGS

FIG. 10 is a flow chart illustrating a part of a heating operation control of the control apparatus that is illustrated in FIG. 7.

DESCRIPTION OF EMBODIMENTS

First Embodiment

Hereinafter, the present invention will be described in detail based on a first embodiment illustrated in accompanying FIGS. 1 to 12.

Figure 1:
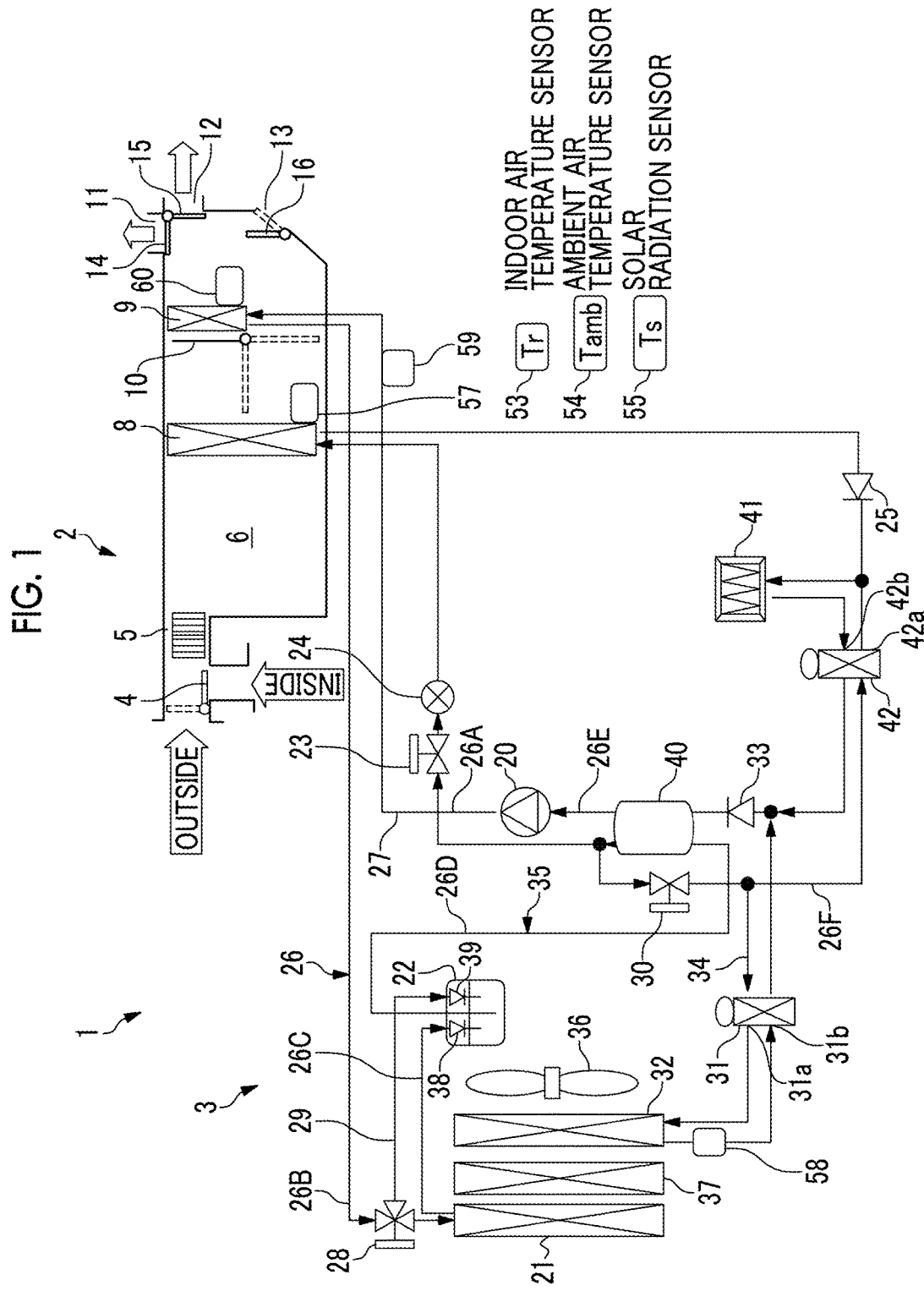
FIG. 1 is a refrigerant circuit diagram of a heat pump type air conditioning apparatus for a vehicle according to an embodiment of the present invention.

A heat pump type air conditioning apparatus 1 for a vehicle illustrated in FIG. 1 includes a heating ventilation and air conditioning unit (HVAC) unit 2 and an air-conditionable heat pump cycle 3.

[Outline of HVAC Unit 2]

The HVAC unit 2 includes a blower 5 that introduces inside air from a cabin or outside air to forcibly feed the air to a downstream side by switching an inside and outside air switching damper 4; and an internal evaporator 8, a temperature regulation damper 10 and an internal condenser 9 which are disposed in the sequence listed from an upstream side to a downstream side of an air flow path 6 that extends from the blower 5. The HVAC unit 2 is a unit that is mounted inside an instrument panel on a front side of the cabin. The HVAC unit 2 blows the air, of which a temperature is regulated by the internal evaporator 8 and the internal condenser 9, into the cabin via any one of a defroster blowing port 11, a face blowing port 12 and a foot blowing port 13 which are opened toward the cabin, based on a blowing mode that is switched by blowing mode switching dampers 14, 15 and 16 (a defroster damper 14, a face damper 15 and a foot damper 16), and air-conditions the cabin to a set temperature.

[Heat Pump Cycle 3]

An electric compressor 20 that compresses a refrigerant; an external condenser 21; a receiver 22; a first electromagnetic valve 23; a first expansion valve 24; the internal evaporator 8; and a check valve 25 are connected in the sequence listed to each other via a refrigerant pipe 26 and thus, the air-conditionable heat pump cycle 3 forms a closed heat pump cycle (a refrigerant circuit). A refrigerating cycle 27 is the same as that of a current air conditioning apparatus for a vehicle that is applied to an engine-driven vehicle.

In the heat pump cycle 3, the refrigerating cycle 27 is configured in such a manner that a discharge pipe (a discharge circuit) 26A from the electric compressor 20 is connected to the internal condenser 9 mounted inside the HVAC unit 2. A three-way switching valve (switching means) 28 is provided on an inlet refrigerant pipe 26B of the external condenser 21, and a first heating circuit 29 is connected to the receiver 22 via the three-way switching valve 28 to introduce the refrigerant condensing in the internal condenser 9 into the receiver 22.

A second heating circuit 34 is connected to between an outlet refrigerant pipe 26D of the receiver 22 and a suction pipe 26E connected to the electric compressor 20, and a second electromagnetic valve 30, a first thermostatic expansion valve 31, an external evaporator 32, and a check valve 33 are provided in the sequence listed in the second heating circuit 34. A refrigerant heater 41 and a second thermostatic expansion valve 42 are provided on the suction pipe 26E in the sequence listed from a side of the check valve 25. A refrigerant pipe 26F is provided between the outlet refrigerant pipe 26D and the suction pipe 26E, and the second electromagnetic valve 30 and the second thermostatic expansion valve 42 are provided on the refrigerant pipe 26F. For example, the refrigerant heater can be configured to have an insulated electrically heated wire as a heating element shielded with a metal pipe, that is, the refrigerant heater 41 can be configured to have a so-called electric sheathed heater. An electric positive temperature coefficient (FTC) heater using a FTC element can be used in the refrigerant heater 41. The refrigerant heater 41 is provided between the internal condenser 9 and a suction side of the electric compressor 20 to be in parallel with the external evaporator 32.

The first thermostatic expansion valve 31 and the second thermostatic expansion valve 42 include passages 31a and 42a, respectively, with a pressure reduction mechanism, and passages 31b and 42b, respectively, without a pressure reduction mechanism. When temperatures are detected on sides of the passages 31b and 42b without the pressure reduction mechanism, opening angles of the pressure reduction mechanisms of the passages 31a and 42a can be adjusted, respectively.

Accordingly, the electric compressor 20, the internal condenser 9 mounted inside the HVAC unit 2, the three-way switching valve 28, the first heating circuit 29, the receiver 22 and the second heating circuit 34 are connected in the sequence listed to each other via the refrigerant pipe 26 and thus, a closed heat pump cycle (a refrigerant circuit) 35 are formed. Two electromagnetic valves may be combined together to form the three-way switching valve 28, irrespective of a specific configuration.

In the heat pump cycle 3, the external evaporator 32 of a heating heat pump cycle 35 is mounted downstream of the external condenser 21 of the refrigerating cycle 27 for cooling in a ventilation passage through which an external fan 36 ventilates outside air, and the external evaporator 32 is parallel with the external condenser 21, and the external fan 36 is shared in common therebetween. The embodiment is configured to further have a radiator 37 that is mounted upstream of the external evaporator 32 to cool down a cooling medium such as a vehicle drive motor, an inverter and a battery. The external condenser 21, the external evaporator 32 and the radiator 37 may be arbitrarily disposed, but according to the disposition of the embodiment, when snow falls or piles up deeply, the external condenser 21 and the radiator 37 for a vehicle protect the external evaporator 32 from snow, and attachment of the snow onto the external evaporator 32 can be reduced. Accordingly, it is possible to ensure heat exchange performance of the external evaporator 32, and to improve heating performance. It is possible to prevent freezing of the external evaporator 32 caused by the attachment of the snow thereonto. When the radiator 37 for a vehicle dissipates heat, the external evaporator 32 absorbs the heat, thereby improving the heating performance.

Furthermore, as illustrated in FIG. 1, the receiver 22 of the embodiment is a check valve integrated receiver that has check valves 38 and 39 integrally and respectively assembled onto two refrigerant inflow ports which are respectively connected to the refrigerant pipe 26C from the external condenser 21 and the first heating circuit 29. An internal heat exchanger 40 is provided between the outlet refrigerant pipe 26D of the receiver 22 and the suction pipe 26E connected to the electric compressor 20 so that the internal heat exchanger 40 exchanges heat between a high-pressure liquid refrigerant flowing through the outlet refrigerant pipe 26D and a low-pressure gaseous refrigerant flowing through the suction pipe 26E to subcool the high-pressure liquid refrigerant. Since the internal heat exchanger 40 is provided, during cooling and heating operations, the high-pressure liquid refrigerant exchanges heat with the low-pressure gaseous refrigerant in the internal heat exchanger 40, and the high-pressure liquid refrigerant subcools, thereby being able to increase the amount of heat absorption in the evaporators 8 and 32. Accordingly, it is possible to increase cooling efficiency and heating efficiency and thus, to improve air conditioning performance of the air conditioning apparatus 1 for a vehicle. In the present invention, since the internal heat exchanger 40 is not an essential configuration element, it is possible to omit the internal heat exchanger 40 and to simplify the air conditioning apparatus for a vehicle.

Subsequently, when the air conditioning apparatus for a vehicle operates, a flow of the refrigerant will be described with reference to FIGS. 2 to 6. In each of the drawings, a flow passage of the refrigerant during the operation is indicated by a bold line.

[Cooling Operation]

Figure 2:
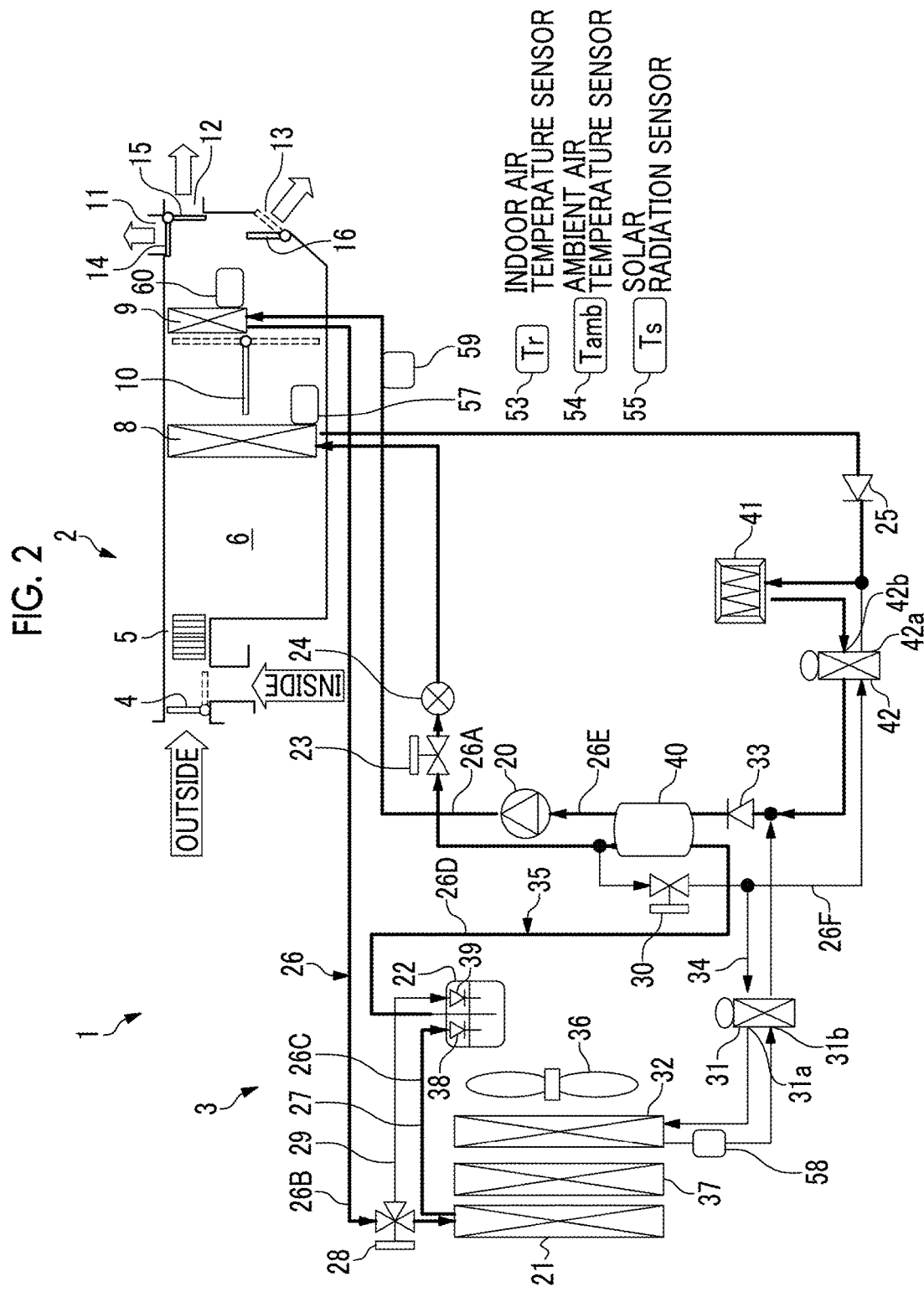
FIG. 2 is a refrigerant circuit diagram illustrating a flow of a refrigerant when a cooling operation is performed by the heat pump type air conditioning apparatus for a vehicle that is illustrated in FIG. 1.

During a cooling operation, as illustrated in FIG. 2, the refrigerant compressed in the electric compressor 20 circulates to the external condenser 21 via the discharge pipe 26A, the internal condenser 9 and the three-way switching valve 28, and the compressed refrigerant exchanges heat with outside air ventilating via the external fan 36 to condense into a liquid. The liquid refrigerant is introduced into the receiver 22 via the refrigerant pipe 26C and the check valve 38 and is reserved for the moment, and then the liquid refrigerant is guided to the first expansion valve 24 via the outlet refrigerant pipe 26D, the internal heat exchanger 40 and the first electromagnetic valve 23, and then, the liquid refrigerant is depressurized into a gas-liquid dual phase in the first expansion valve 24 and the gas-liquid dual refrigerant is supplied to the internal evaporator 8. When the high-pressure liquid refrigerant flows through the internal heat exchanger 40, the high-pressure liquid refrigerant exchanges heat with the low-pressure gaseous refrigerant that evaporates in the internal evaporator 8 and thus, the high-pressure liquid refrigerant subcools.

In the internal evaporator 8, the refrigerant exchanges heat with inside air or outside air sent from the blower 5 to be transformed into an evaporative gas, the evaporative gaseous refrigerant is suctioned into the electric compressor 20 via the check valve 25, the refrigerant heater 41, the second thermostatic expansion valve 42 and the internal heat exchanger 40, and the evaporative gaseous refrigerant is re-compressed. At this time, the refrigerant heater 41 is in a stop state (an OFF state). Hereinafter, the same cycle is repeated. The refrigerating cycle 27 is the same as that of the current air conditioning apparatus for a vehicle that is applied to an engine-driven vehicle, and can be used as it is. Based on a blowing mode switched by the blowing mode switching dampers 14, 15 and 16, the inside air or the outside air cooled down by the heat exchange with the refrigerant in the internal evaporator 8 is blown into the cabin via any one of the defroster blowing port 11, the face blowing port 12 and the foot blowing port 13 to serve to cool the cabin.

Herein, the pipe is provided in such a manner that the refrigerant flowing out of the refrigerant heater 41 is suctioned into the electric compressor 20 via the second passage 42b without the pressure reduction mechanism of the second thermostatic expansion valve 42 and thus, a pipe passage from the refrigerant heater 41 to the electric compressor 20 can be used not only in the cooling operation but also a heating operation and a defrosting operation. That is, as described later, in Case II, even in the heating operation (refer to FIG. 5) or even in the defrosting operation (refer to FIG. 6) after frost formation is detected, the refrigerant is suctioned into the electric compressor 20 via the passage 42b of the second thermostatic expansion valve 42.

During the cooling operation, ventilation air toward the internal condenser 9 is shut off by the temperature regulation damper 10, and cool air cooling down in the internal evaporator 8 is blown into the cabin as it is. Accordingly, while almost all of the refrigerant does not condense in the internal condenser 9, the refrigerant circulates to the external condenser 21 and exchanges heat with the outside air in the external condenser 21 to condense into a liquid. In contrast, while the refrigerating cycle 27 operates, when the temperature regulation damper 10 provided onto the inlet of the internal condenser 9 is open to ventilate a part of the cool air cooling down in the internal evaporator 8 toward the internal condenser 9 and thus, the cool air is heated again, a reheating and dehumidification operation can be performed.

[Heating Operation (Before Frost Formation Occurs)]

Figure 3:
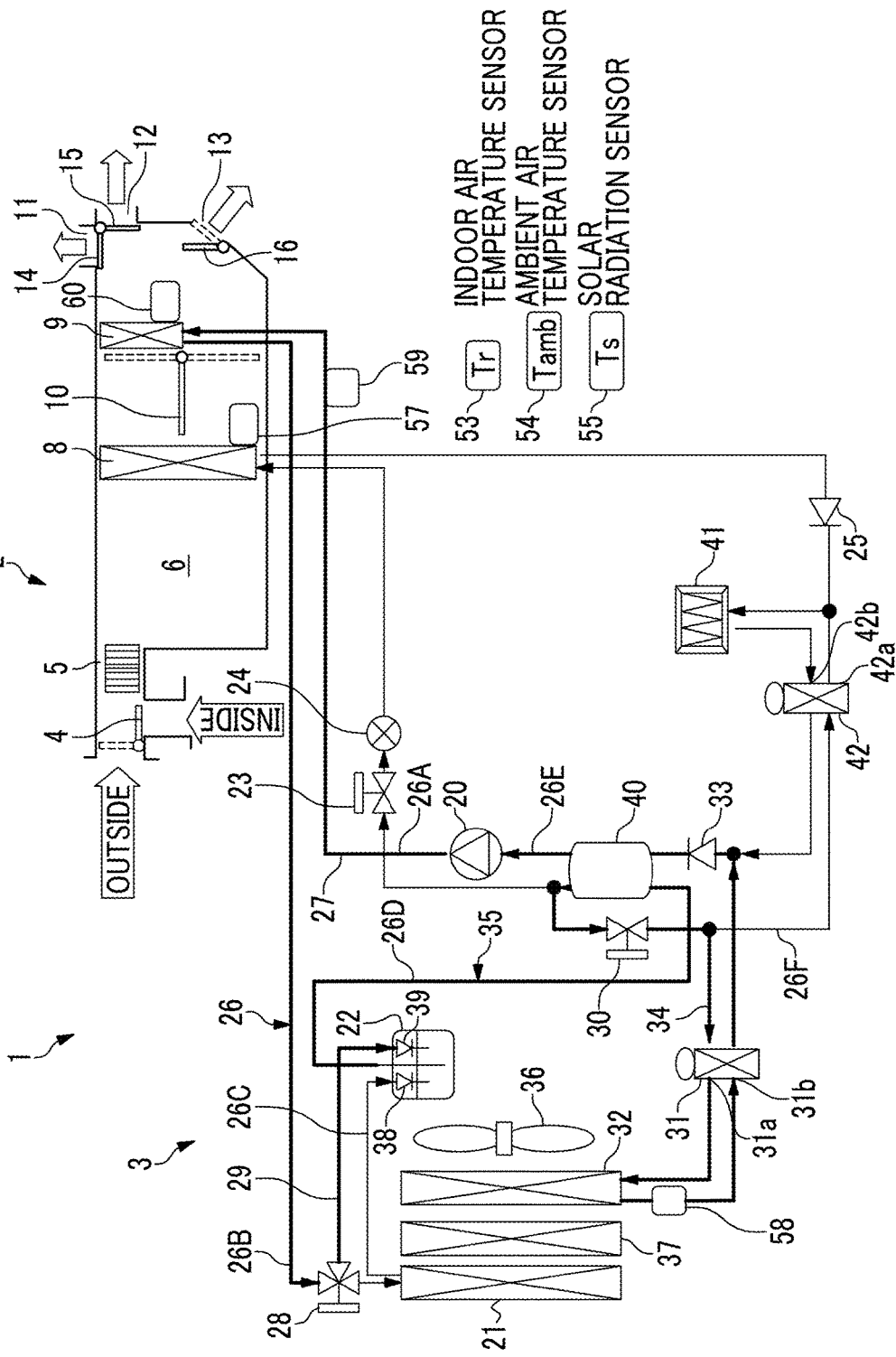
FIG. 3 is a refrigerant circuit diagram illustrating a flow of the refrigerant when a heating operation (before frost formation occurs) is performed by the heat pump type air conditioning apparatus for a vehicle that is illustrated in FIG. 1.

During the heating operation, as illustrated in FIG. 3, until frost formation occurs in the external evaporator 32, the refrigerant compressed in the electric compressor 20 is introduced into the internal condenser 9 via the discharge pipe 26A, and in the internal condenser 9, the compressed refrigerant exchanges heat with inside air or outside air sent from the blower 5 to dissipate heat. Accordingly, based on a blowing mode, the heated air is blown into the cabin via any one of the defroster blowing port 11, the face blowing port 12 and the foot blowing port 13 to serve to heat the cabin. Typically, the heating operation is performed in an outside air introduction mode to prevent foggy windows.

The refrigerant, which condenses into a liquid by the heat dissipation in the internal condenser 9, is guided to the first heating circuit 29 via the three-way switching valve 28, and is introduced into the receiver 22 via the check valve 39. The refrigerant reserved in the receiver 22 for the moment is guided to the second heating circuit 34 via the outlet refrigerant pipe 26D and the internal heat exchanger 40, and when the refrigerant passes through the passage 31a with the pressure reduction mechanism of the first thermostatic expansion valve 31, via the second electromagnetic valve 30, the refrigerant is depressurized into a gas-liquid dual phase and the gas-liquid dual phase refrigerant is supplied to the external evaporator 32. When the high-pressure liquid refrigerant flows through the internal heat exchanger 40, the high-pressure liquid refrigerant exchanges heat with the low-pressure gaseous refrigerant that evaporates in the external evaporator 32 and thus, the high-pressure liquid refrigerant subcools.

The refrigerant supplied to the external evaporator 32 exchanges heat with outside air ventilated by the external fan 36 in the external evaporator 32 to absorb heat from the outside air and thus, the refrigerant is transformed into an evaporative gas. Thereafter, the evaporative gaseous refrigerant is suctioned into the electric compressor 20 via the first thermostatic expansion valve 31, the check valve 33 and the internal heat exchanger 40, and is re-compressed. Hereinafter, the same cycle is repeated. The heat pump heating is performed by the heat pump cycle 35 for heating.

As such, the minimum heating circuits and equipment are connected to each other as the following: the internal condenser 9 that is connected to the discharge pipe (the discharge circuit) 26A of the refrigerating cycle 27 for cooling; the first heating circuit 29 that is provided between the three-way switching valve 28 provided on an inlet side of the external condenser 21 and the receiver 22; and the second heating circuit 34 in which the first electromagnetic valve 30, the first thermostatic expansion valve 31 and the external evaporator 32 are provided between an outlet side of the receiver 22 and the suction side of the electric compressor 20. Accordingly, the heat pump cycle 35 for heating can be configured in such a manner that a part of the circuits and the equipment under the same pressure condition can be used in common.

[Heating Operation (After Frost Formation Occurs)]

As described above, at a low ambient air temperature, when the heat absorption from the outside air occurs in the external evaporator 32, and the heating operation is performed, there is a problem in that frost is formed on a surface of the external evaporator 32, heating capability deteriorates as the frost formation progresses and finally, the heating is not possible. In the embodiment, an operation to be performed is selected from the following two cases. Details will be described later, and when introduction of outside air is requested by an occupant, Case I is selected for the heating operation, and when there is not such a request, Case II is selected for the heating operation.

(Case I)

In Case I, the refrigerant is heated by the refrigerant heater 41 in replacement of the external evaporator 32.

Figure 4:
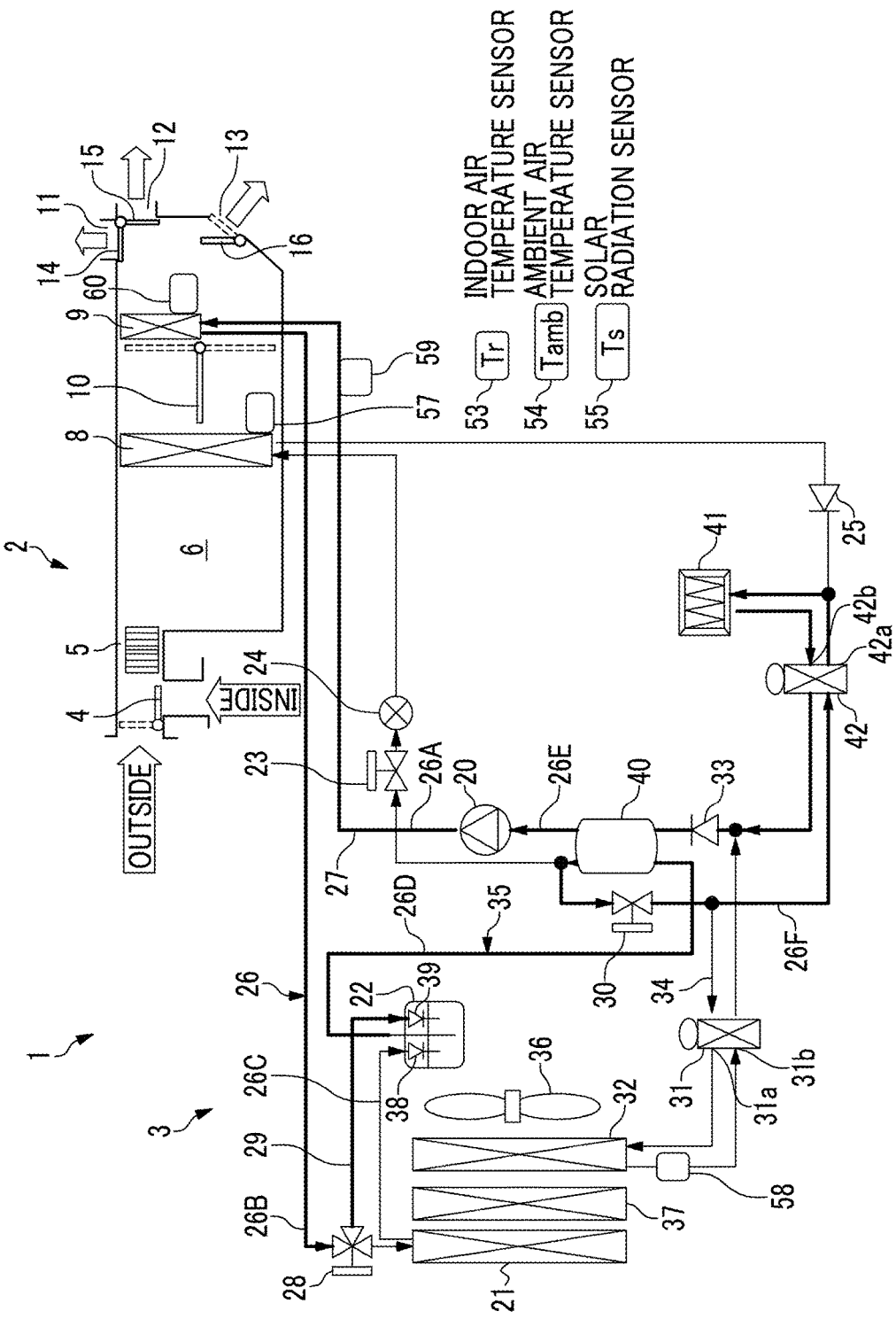
FIG. 4 is a refrigerant circuit diagram illustrating a flow of the refrigerant when a heating operation (after frost formation occurs) is performed by the heat pump type air conditioning apparatus for a vehicle that is illustrated in FIG. 1.

In Case I, when frost formation in the external evaporator 32 is detected, the refrigerant heater 41 operates. As illustrated in FIG. 4, when the refrigerant evaporates and starts superheat due to the refrigerant heater 41, the passage 42a without the pressure reduction mechanism of the second thermostatic expansion valve 42 is opened (ON), and the refrigerant flows into the refrigerant heater 41 via the refrigerant pipe 26F. Accordingly, as illustrated in FIG. 4, the refrigerant decreasingly flows into the external evaporator 32, the refrigerant is not in a superheated state, and the passage 31a with the pressure reduction mechanism of the first thermostatic expansion valve 31 is closed (OFF). At this stage, the first electromagnetic valve 23 is closed (OFF), and the second electromagnetic valve 30 is open (ON).

The heating operation is the same as the heating operation before the defrosting operation is performed by the fact that the refrigerant heated by the refrigerant heater 41 flows via the internal heat exchanger 40, then is compressed by the electric compressor 20, then is introduced into the internal condenser 9 via the discharge pipe 26A, and then in the internal condenser 9, the compressed refrigerant exchanges heat with outside air sent from the blower 5 to dissipate heat.

The refrigerant, which condenses into a liquid by the heat dissipation in the internal condenser 9, is introduced into the receiver 22 via the three-way switching valve 28 and the check valve 39. The refrigerant reserved in the receiver 22 for the moment returns to the second thermostatic expansion valve 42 via the outlet refrigerant pipe 26D, the internal heat exchanger 40 and the first electromagnetic valve 30. Hereinafter, the same cycle is repeated, and the heat pump heating is performed using the refrigerant heater 41.

(Case II)

In Case II, an air introduction mode is switched to an inside air circulation mode in such a manner that heating can be performed by absorbing heat from high-temperature air in the cabin, and the heating operation is performed.

Figure 5:
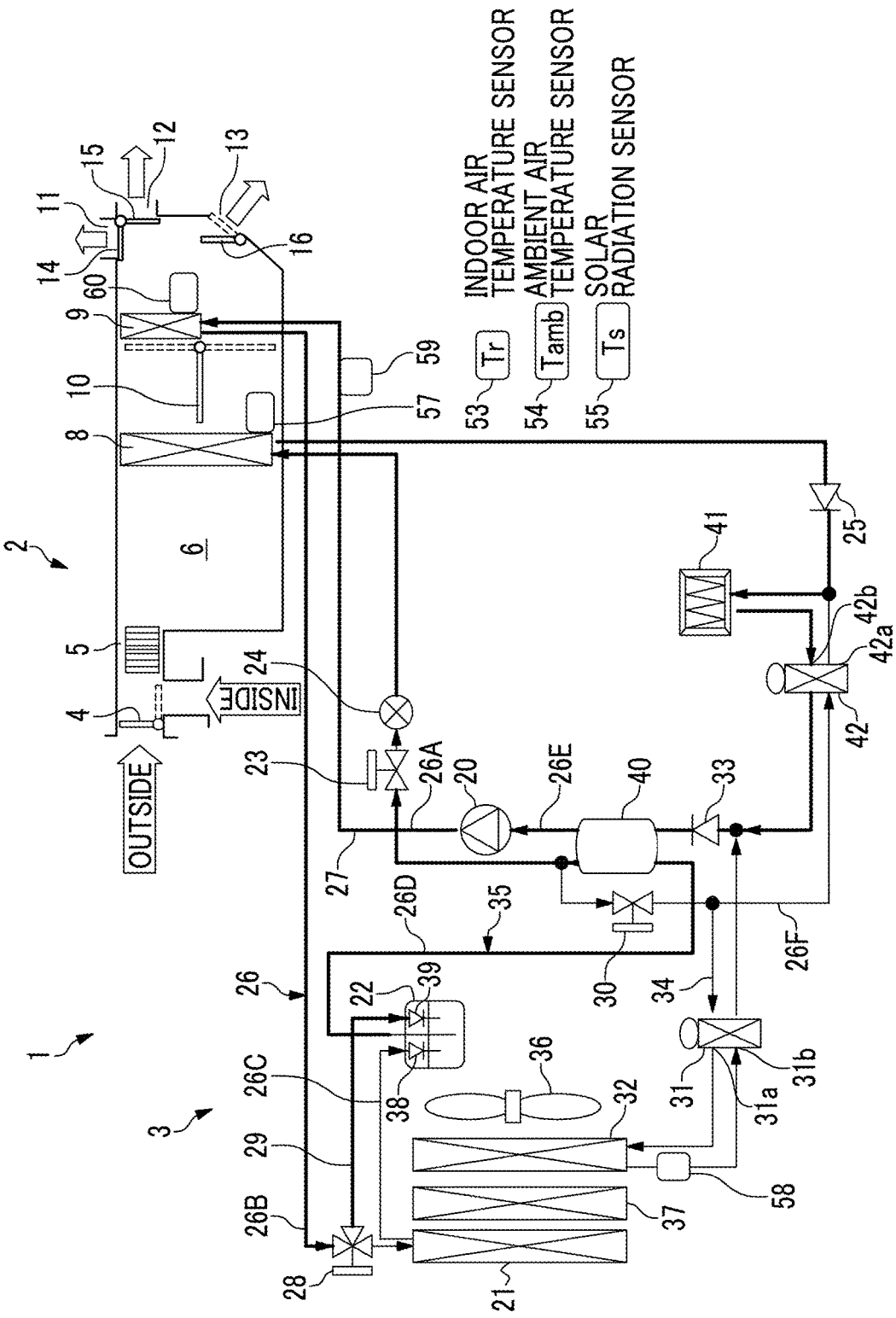
FIG. 5 is a refrigerant circuit diagram illustrating a flow of the refrigerant when a heating operation (a dehumidification and heating before frost formation occurs) is performed by the heat pump type air conditioning apparatus for a vehicle that is illustrated in FIG. 1.

As illustrated in FIG. 5, similarly to the heating operation (refer to FIG. 3) before frost formation occurs, first, the refrigerant compressed by the electric compressor 20 is introduced into the internal condenser 9 via the discharge pipe 26A, and in the internal condenser 9, the compressed refrigerant exchanges heat with inside air sent from the blower 5 to dissipate heat. Accordingly, based on a blowing mode, the heated air is blown into the cabin via any one of the defroster blowing port 11, the face blowing port 12 and the foot blowing port 13 to serve to heat the cabin.

The refrigerant, which condenses into a liquid by the heat dissipation in the internal condenser 9, is guided to the first heating circuit 29 via the three-way switching valve 28, and is introduced into the receiver 22 via the check valve 39. The refrigerant reserved in the receiver 22 for the moment is guided to the first expansion valve 24 via the outlet refrigerant pipe 26D, the internal heat exchanger 40 and the first electromagnetic valve 23, the refrigerant is depressurized into a gas-liquid dual phase, and the gas-liquid dual phase refrigerant is supplied to the internal evaporator 8. When the high-pressure liquid refrigerant flows through the internal heat exchanger 40, the high-pressure liquid refrigerant exchanges heat with the low-pressure gaseous refrigerant that evaporates in the internal evaporator 8 and thus, the high-pressure liquid refrigerant subcools.

In the internal evaporator 8, the refrigerant exchanges heat with inside air sent from the blower 5 to be transformed into an evaporative gas, the evaporative gaseous refrigerant is suctioned into the electric compressor 20 via the check valve 25, the refrigerant heater 41, the second thermostatic expansion valve 42 and the internal heat exchanger 40, and the evaporative gaseous refrigerant is re-compressed. Hereinafter, the same cycle is repeated. The refrigerant absorbs heat from the air (the inside air) in the internal evaporator 8 and thus, the air is cooled and dehumidified. As described above, the cooled and dehumidified air is heated in the internal condenser 9 mounted downstream of the internal evaporator 8, and is blown into the cabin via any one of the defroster blowing port 11, the face blowing port 12 and the foot blowing port 13 to serve to heat the cabin.

As such, in Case II, since a dehumidification and heating operation is performed by using the internal evaporator 8, there is no concern of windows being fogged.

[Defrosting Operation]

As described above, when the heating operation is performed by an operation of the external evaporator 32, even though frost formation in the external evaporator 32 is detected, a defrosting operation is not performed immediately, an operation mode is switched to the operation (the heating operation using the outside air (refer FIG. 4)) of Case or the operation (the dehumidification and heating operation using the inside air (refer to FIG. 5)) of Case II, and the heating operation is continuously performed as it is. For this reason, while the vehicle is travelling (is in use), the defrost operation is not forcibly performed, and an occupant waits for the external evaporator 32 to be naturally defrosted by the outside air. However, when the ambient air temperature is continuously low, it is assumed that the external evaporator 32 is not defrosted and frost is attached onto the external evaporator 32.

Figure 6:
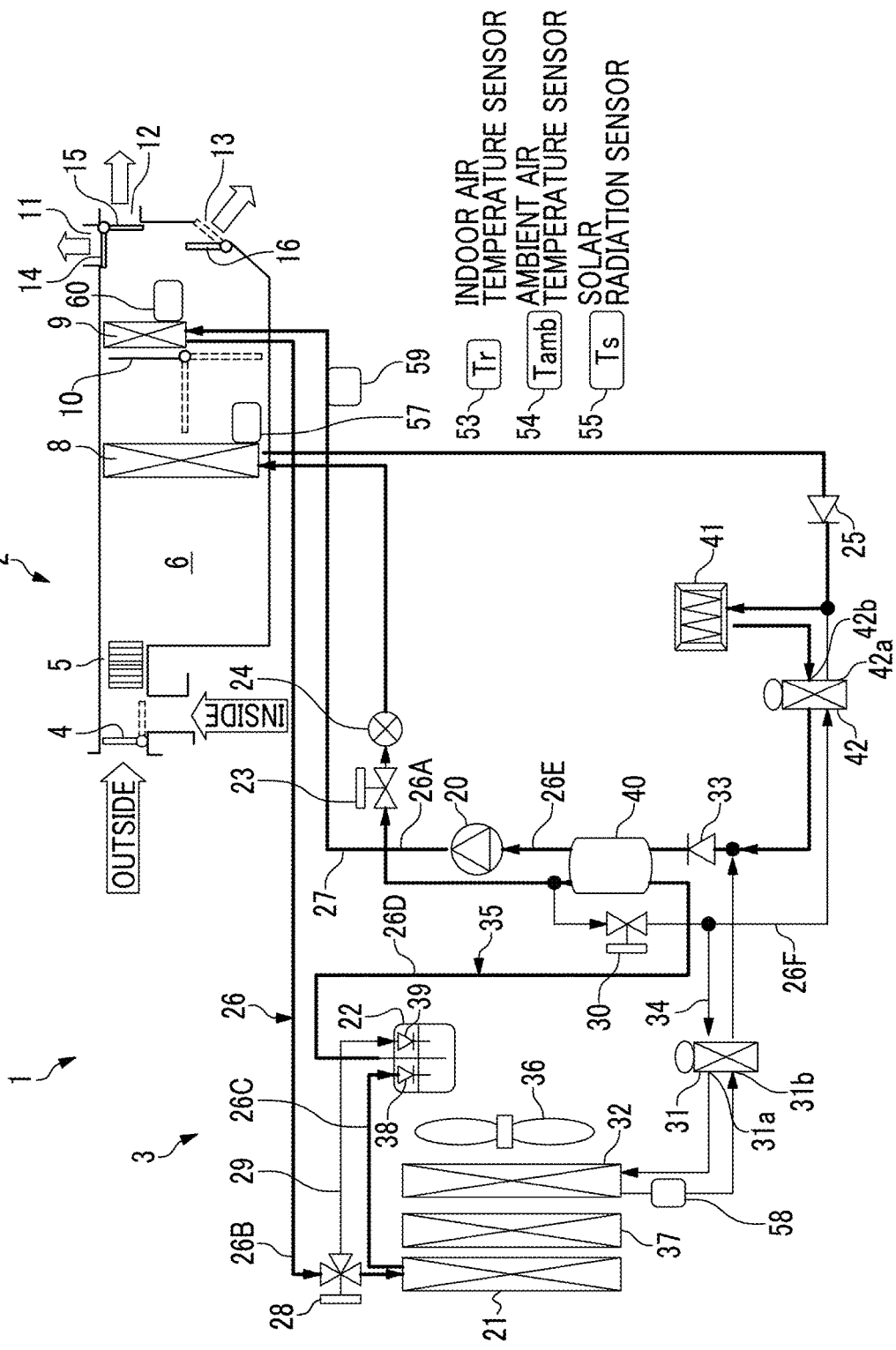
FIG. 6 is a refrigerant circuit diagram illustrating a flow of the refrigerant when a defrosting operation is performed by the heat pump type air conditioning apparatus for a vehicle that is illustrated in FIG. 1.

In a state where the vehicle stops (is parked) and an occupant is not in the vehicle, desirably, while a battery of the vehicle is being charged or the battery has spare capacity after the battery is charged, the air conditioning apparatus 1 operates to perform the defrosting operation. As illustrated in FIG. 6, a hot gaseous refrigerant compressed by the electric compressor 20 circulates to the external condenser 21 via the discharge pipe 26A, the internal condenser 9 and the three-way switching valve 28, the hot gaseous refrigerant dissipates heat to outside air ventilating via the external fan 36 and thus, the defrosting operation is performed. The temperature of the outside air increases due to heat dissipated from the hot gaseous refrigerant, and the warm outside air is blown to the external evaporator 32 disposed downstream of the external condenser 21 to melt frost.

The refrigerant condensed due to the heat dissipation in the external condenser 21 reaches the first expansion valve 24 via the refrigerant pipe 26C, the receiver 22, the outlet refrigerant pipe 26D, the internal heat exchanger 40 and the first electromagnetic valve 23, and the refrigerant is depressurized in the first expansion valve 24 and is supplied to the internal evaporator 8. The gas-liquid dual phase refrigerant supplied to the internal evaporator 8 absorbs heat from air (the inside air) in the cabin which circulates via blower 5 to evaporate, and is suctioned into the electric compressor 20 via the check valve 25, the refrigerant heater 41, the second thermostatic expansion valve 42 and the internal heat exchanger 40. Hereinafter, when the refrigerating cycle 27 is repeated, frost of the external evaporator 32 is indirectly melted by using heat dissipated from the hot gaseous refrigerant in the external condenser 21 and thus, the external evaporator 32 can be defrosted.

For this reason, even during the defrosting operation, it is possible to defrost the external evaporator 32 without flowing a high-pressure hot gaseous refrigerant through the external evaporator 32 designed to a low pressure specification. Since the defrosting operation is performed in a state where an occupant is not in the vehicle, it is possible to set a side of the HVAC unit 2 to an optimum mode suitable for defrosting and to perform the defrosting operation without an air conditioning state in the cabin or a blowing mode being particularly taken into consideration. In the embodiment, in a state where the inside and outside air switching damper 4 is set to the inside air circulation mode in such a manner that the refrigerant absorbs heat from air of as high as possible a temperature in the internal evaporator 8, and the temperature regulation damper 10 is set to the maximum cooling position (a MAX COOL position) to reduce a heat loss resulting from the heat dissipation in the internal condenser 9, the defrosting operation is performed. Since it is possible to perform the defrosting operation by effectively using a quantity of heat of the hot gaseous refrigerant, the external evaporator 32 can be defrosted in a short time. In a state where the vehicle stops and an occupant is not in the vehicle, the defrosting operation is performed while or after a battery of the vehicle is charged. Accordingly, it is possible to prevent the defrosting operation from affecting a travelling distance of the vehicle. It is possible to perform the defrosting operation while the battery of the vehicle is being charged or when the battery has spare capacity after the battery is charged. Accordingly, it is possible to efficiently and reliably defrost the external evaporator 32 without affecting the occupant.

Furthermore, even in the blowing mode, if a foot mode is selected to blow air from the foot blowing port 13, the air blowing from the foot blowing port 13 is short-circuited to a suction port for inside air circulation which is open in the proximity of the foot blowing port 13 and thus, it is difficult to suction high-temperature air in the cabin into the air conditioning apparatus for a vehicle. During the defrosting operation, the blowing mode is selected from any one of a defroster mode, a face mode and a bi-level mode other than the foot mode. Accordingly, since air of as high as possible a temperature is suctioned from the cabin due to internal circulation, it is possible to effectively defrost the external evaporator 32 in a short time.

When the heat pump heating operation (the heating operation before the frost formation occurs) is performed by using the external evaporator 32, and frost formation detection means (means for determining whether a difference in temperature between an external evaporator refrigerant temperature sensor (T1) 58 and an ambient air temperature sensor (Tamb) 54, which will be described later, is equal to or greater than a set value a) confirms that there is no more frost formation, the defrosting operation finishes. That is, since based on the fact that the frost formation detection means does not operate any more, it is confirmed that the defrosting of the external evaporator 32 finishes, and it is possible to reliably defrost the external evaporator 32 in order for residual frost not to exist.

[Air Conditioning Control Apparatus 50]

Figure 7:
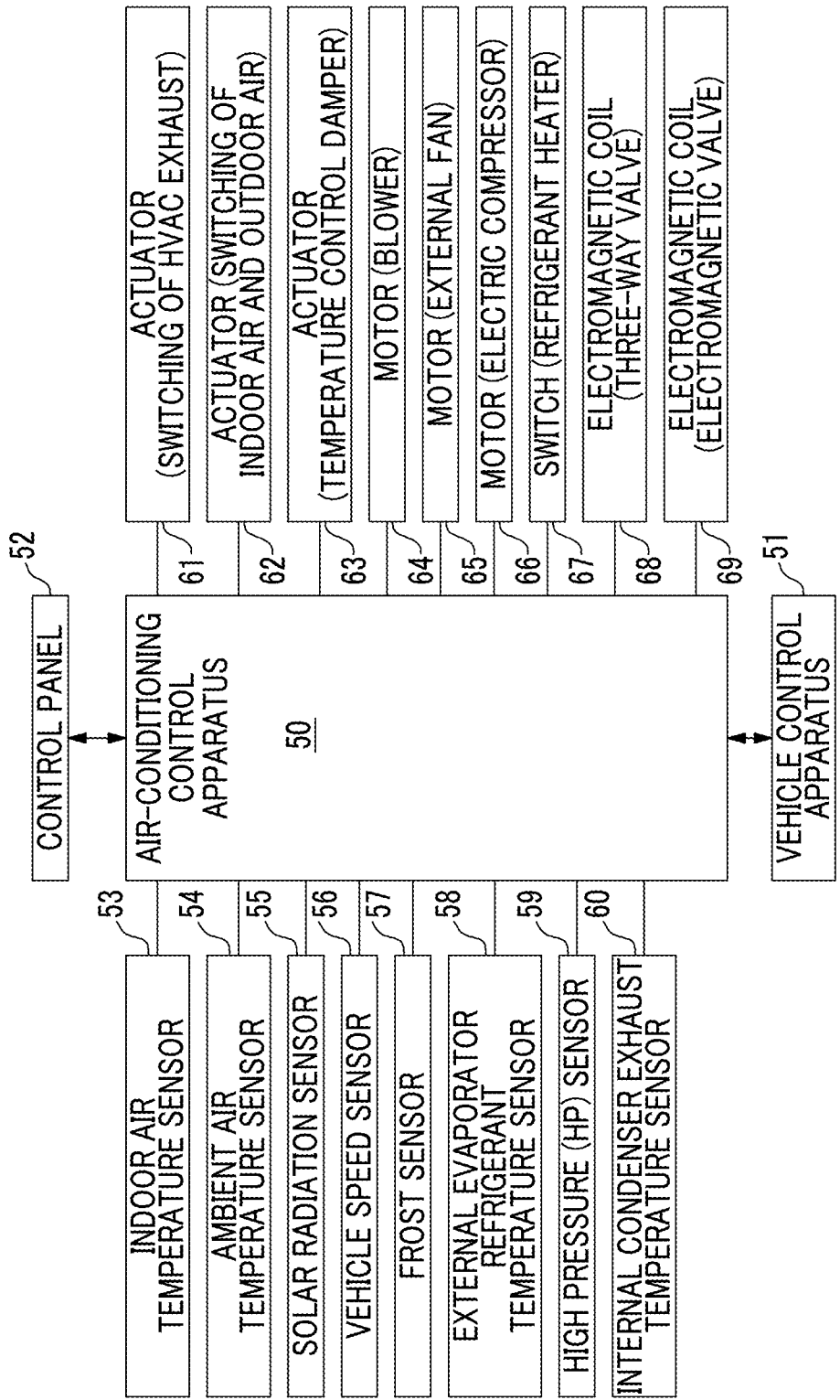
FIG. 7 is a block diagram of a control apparatus that controls the heat pump type air conditioning apparatus for a vehicle that is illustrated in FIG. 1.

The operation modes described above are controlled by an air conditioning control apparatus 50 illustrated in FIG. 7. The air conditioning control apparatus 50 is connected to a higher level vehicle control apparatus 51 to be able to receive related information input from a side of the vehicle, and includes a control panel 52. Based on detection signals from various sensors to be described below and information input from the vehicle control apparatus 51 and the control panel 52, the air conditioning control apparatus 50 controls an operation of the air conditioning apparatus 1 for a vehicle.

The air conditioning control apparatus 50 receives detection signals input from the following sensors: an inside air temperature sensor (Tr) 53, an ambient air temperature sensor (Tamb) 54, a solar radiation sensor (Ts) 55, and a vehicle speed sensor 56 which are mounted at appropriate positions on the vehicle; a frost sensor (FS) 57 mounted on the internal evaporator 8 of the air conditioning apparatus 1 for a vehicle; an external evaporator refrigerant temperature sensor (T1) 58 mounted on the external evaporator 32; a high pressure sensor (HP) 59 mounted on the discharge pipe 26A; and an internal condenser blowing temperature sensor (Tc) 60 mounted on the internal condenser 9.

Based on detection signals from various sensors described above and information input from the control panel 52 and the vehicle control apparatus 51, the air conditioning control apparatus 50 performs necessary arithmetic calculation and processes and the like by using a preset program to control an actuator 61 for the blowing mode switching dampers 14, 15 and 16, an actuator 62 for the inside and outside air switching damper 4, an actuator 63 for the temperature regulation damper 10, a motor 64 for the blower 5, a motor 65 for the external fan 36, a motor 66 for the electric compressor 20, an on/off switch 67 for the refrigerant heater 41, an electromagnetic coil for the three-way switching valve 28, an electromagnetic coil 69 for the electromagnetic valves 23 and 30 and the like. Accordingly, the air conditioning control apparatus 50 serves to control an operation of the air conditioning apparatus 1 for a vehicle.

[Operation Control]

Hereinafter, operation control of the air conditioning apparatus 1 for a vehicle by the air conditioning control apparatus 50 will be described with reference to flow charts illustrated in FIGS. 8 to 12.

Figure 8:
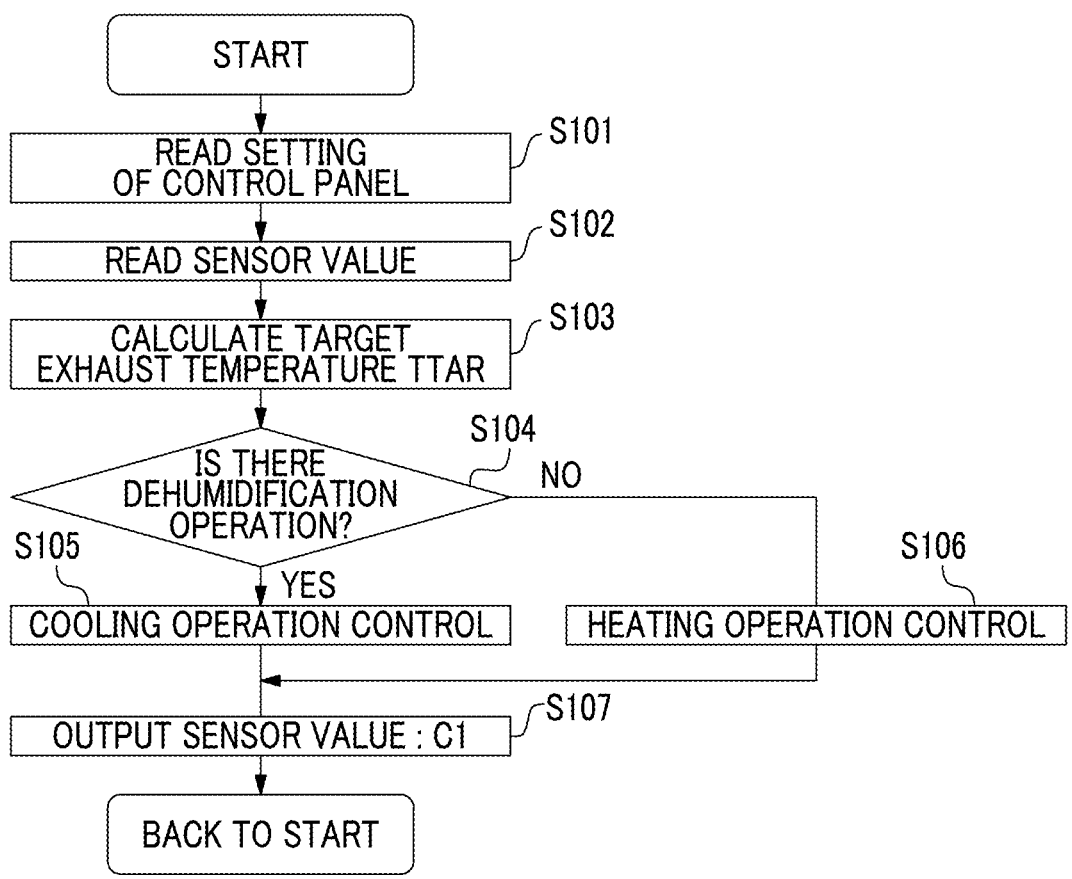
FIG. 8 is a flow chart illustrating an operation control of the control apparatus that is illustrated in FIG. 7.

FIG. 8 is a flow chart of a main control of the air conditioning apparatus 1 for a vehicle. When the air conditioning control apparatus 50 starts controlling the air conditioning apparatus 1 for a vehicle, first, the air conditioning control apparatus 50 reads a setting of the control panel 52 in step S101, and reads detected values from the sensors 53 to 60 of various types in step S102. Based on the set values and the detected values, the air conditioning control apparatus calculates a target blowing temperature Ttar in step S103, and a control process proceeds to step S104. In step S104, the air conditioning control apparatus 50 determines whether an operation mode is a dehumidification operation. When the dehumidification operation is performed (Yes), the control process proceeds to step S105, and the air conditioning control apparatus 50 enters a "cooling operation control" mode. When the dehumidification operation is not performed (No), the control process proceeds to step S106, and the air conditioning control apparatus 50 enters a "heating operation control" mode. Thereafter, in step S107, the air conditioning control apparatus 50 outputs the detected values of the sensors 53 to 60 of various types, and the control process returns to a starting point.

Figure 9:
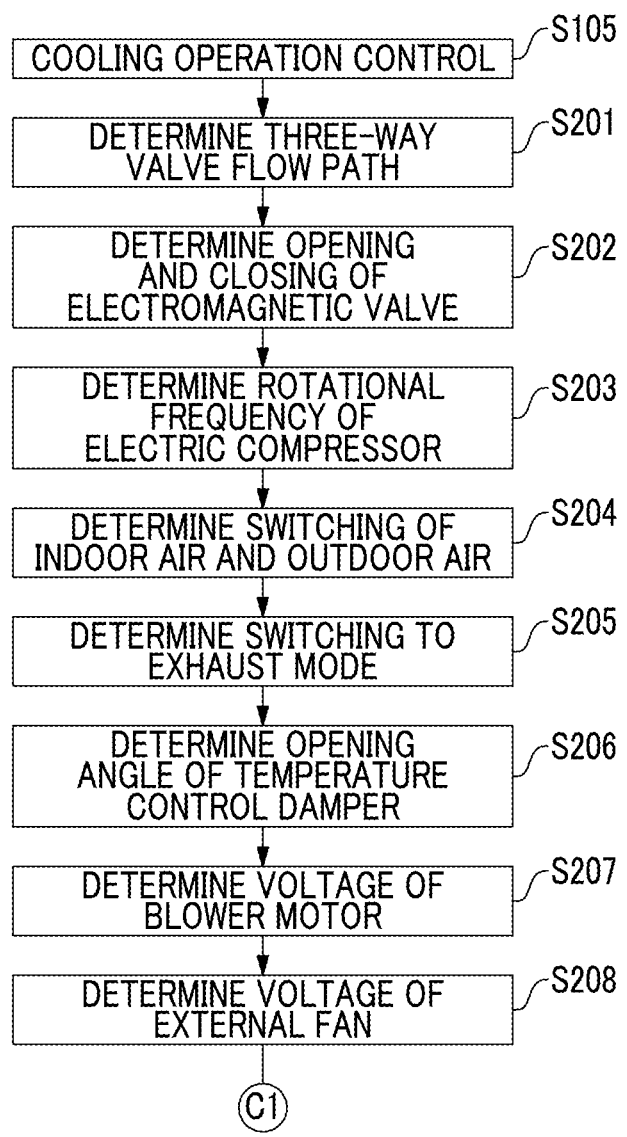
FIG. 9 is a flow chart illustrating a cooling operation control of the control apparatus that illustrated in FIG. 7.

In step S105, when the air conditioning control apparatus 50 enters the "cooling operation control" mode, the cooling operation control is performed as illustrated in FIG. 9.

In the cooling operation control mode, in step 201, first, a flow path of the three-way switching valve 28 is determined to connect a circuit through which the refrigerant flows to a side of the external condenser 21. Subsequently, in step S202, opening and closing of the electromagnetic valves are determined, and the first electromagnetic valve 23 is open (ON) and the second electromagnetic valve 30 is closed (OFF). Accordingly, the refrigerating cycle 27 for cooling is set.

Subsequently, the air conditioning control apparatus 50 determines the following: the rotational frequency of the electric compressor 20 in step S203; a suction mode switched by the inside and outside air switching damper 4 in step S204; a blowing mode switched by the blowing mode switching dampers 14, 15 and 16 in step S205; an opening angle of the temperature regulation damper 10 in step S206; a drive voltage of the blower 5 in step S207; and a drive voltage of the external fan 36 in step S208. The motors and the actuators 61 to 66 are driven. Accordingly, the cooling operation is performed in such a manner that a temperature in the cabin becomes a set temperature. Thereafter, the control process proceeds to C1 (the step S107), and the cooling operation is continuously performed.

Figure 11:
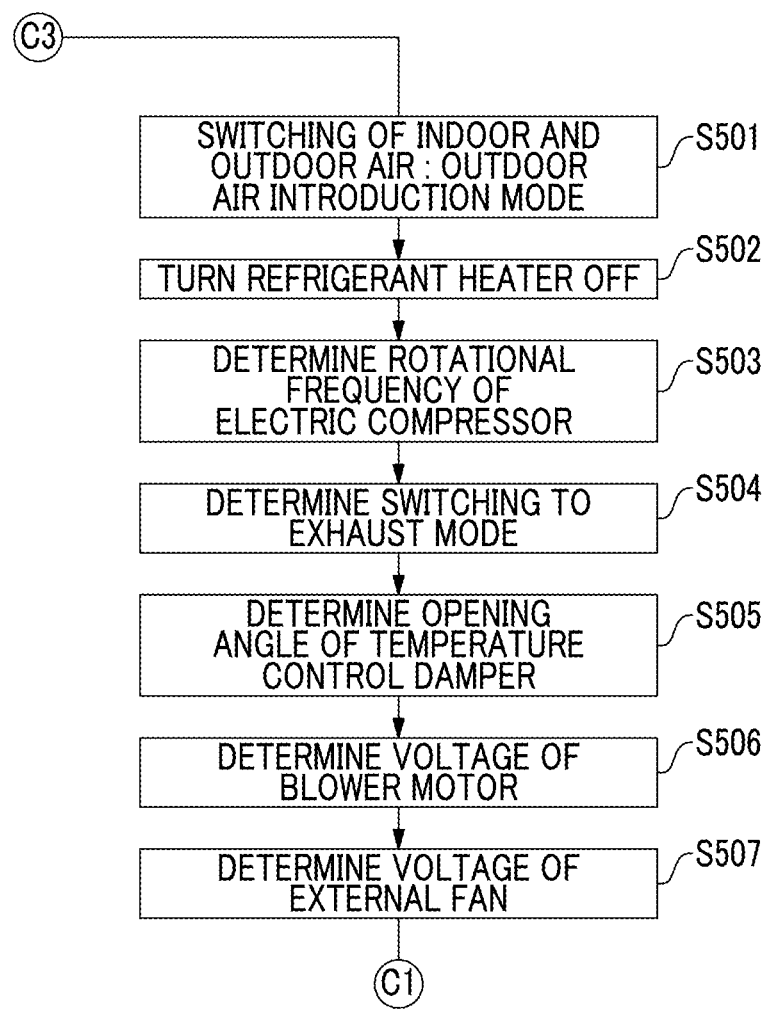
FIG. 11 is a flow chart illustrating the rest of the heating operation control which is not illustrated in FIG. 10.

In step S106 in FIG. 8, when the air conditioning control apparatus 50 enters the "heating operation control" mode, the heating operation control is performed as illustrated in FIGS. 10 and 11.

In the heating operation control mode, in step 301, first, a flow path of the three-way switching valve 28 is determined to connect a circuit through which the refrigerant flows to a side of the first heating circuit 29. Subsequently, in step S302, opening and closing of the electromagnetic valves are determined, and the electromagnetic valve 23 is closed and the electromagnetic valve 30 is open. Accordingly, the heat pump cycle 35 for heating before frost formation occurs is set. Thereafter, the control process proceeds to step S303. In step S303, the air conditioning control apparatus 50 determines whether the external evaporator 32 is frosted.

In step S303, it is determined whether frost formation occurs based on whether a difference between a detected value T1 of the external evaporator refrigerant temperature sensor 58 and a detected value Tamb of the ambient air temperature sensor 54 is equal to or greater than the set value a (Tamb−T1≥a). When it is determined that the frost formation occurs (Yes), the control process proceeds to step S304, and when it determined that the frost formation does not occur (No), the control process proceeds to step S501 (refer to FIG. 11). Herein, when it is determined that the frost formation does not occur, the air conditioning control apparatus 50 operates the external evaporator 32 as an evaporator to perform the heating operation (refer to FIG. 3) by the heat pump cycle 35 before the frost formation occurs. In step S501, an air introduction mode determined to be the outside air introduction mode by the inside and outside air switching damper 4, and the control process proceeds to step S306.

After the refrigerant heater 41 is set to be OFF in step S502, the air conditioning control apparatus 50 determines the following: the rotational frequency of the electric compressor 20 in step S503; a blowing mode switched by the blowing mode switching dampers 14, 15 and 16 in step S504; an opening angle of the temperature regulation damper 10 in step S505; a drive voltage of the blower 5 in step S506; a drive voltage of the external fan 36 in step S507; and the like. The motors and the actuators 61, and 63 to 66 are driven. Accordingly, the heating operation is performed in such a manner that a temperature in the cabin becomes a set temperature. Thereafter, the control process proceeds to C1 (the step S107), and the heating operation is continuously performed.

In contrast, in step S303, when it is determined that the frost formation occurs, the control process proceeds to step S304. In step S304, it is determined whether vehicle power is ON or OFF. When the vehicle power is OFF (No), the control process proceeds to step S401, and when the vehicle power is ON (Yes), the control process proceeds to step S305.

In step S305, it is determined whether there is an instruction to select the outside air introduction mode. If there is no instruction (instruction for outside air) to select the outside air introduction mode, an air introduction mode is determined to be the inside air circulation mode (Yes). Subsequently, in step S313, the first electromagnetic valve 23 is open (ON), and the second electromagnetic valve 30 is closed (OFF).

Subsequently, the control process proceeds to step S306. In step S306, it is determined whether a difference between the target blowing temperature Ttar and a detected value Tco of the internal condenser blowing temperature sensor 60 is equal to or greater than a set value b (Ttar−Tco≥b), or whether a detected value Fs of the frost sensor 57 is equal to or less than a set value c (Fs≤c). When it is determined that Ttar−Tco≥b or Fs≤c (Yes), the control process proceeds to step S307, and the refrigerant heater 41 is ON. If not (No), the control process proceeds to step S308, and the refrigerant heater 41 is OFF. As such, when it is determined that only the heat pump heating is not sufficient, the refrigerant heater 41 compensates for heating capability.

Subsequently, in step S309, the air conditioning control apparatus 50 determines the following: the rotational frequency of the electric compressor 20 in step S309; a blowing mode switched by the blowing mode switching dampers 14, 15 and 16 in step S310; an opening angle of the temperature regulation damper 10 in step S311; and a drive voltage of the blower 5 in step S312. The motors and the actuators 61, 63, 64 and 66 are driven. Accordingly, the heating operation after the external evaporator 32 frosts is performed in such a manner that a temperature in the cabin becomes a set temperature. Thereafter, the control process proceeds to C1 (the step S107), and the heating operation is continuously performed.

Figure 13:
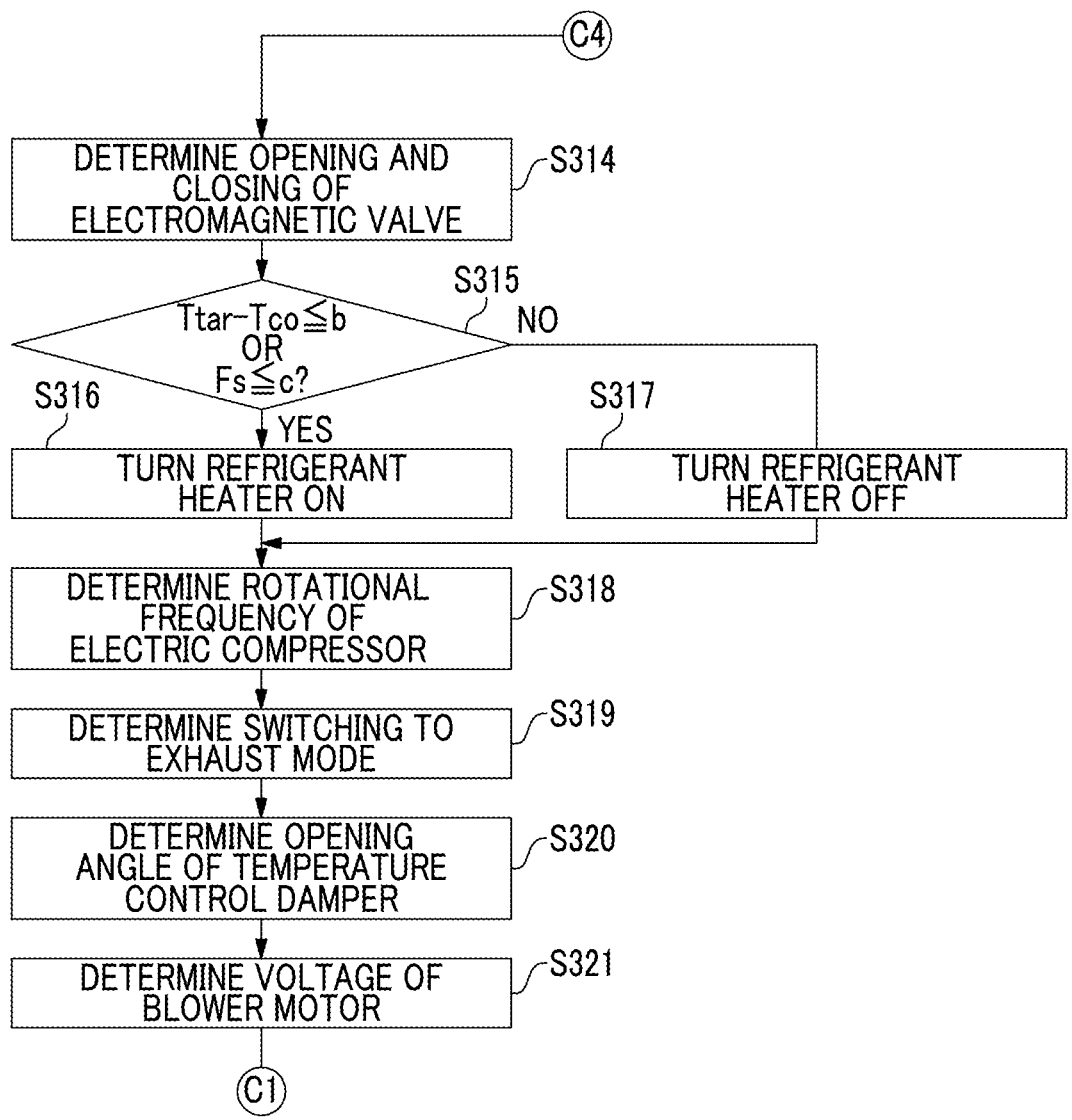
FIG. 13 is a flow chart illustrating the rest of the heating operation control which is not illustrated in FIG. 10.

In step S305, when there is an instruction (the instruction for outside air) to select the outside air introduction mode, an air introduction mode is determined to be the outside air introduction mode (No). Subsequently, in step S314 illustrated in FIG. 13, the first electromagnetic valve 23 is closed (OFF), and the second electromagnetic valve 30 is open (ON).

Thereafter, in each of steps S315 to S321, the inside air circulation mode is performed similarly to in steps S306 to S312, and the heating operation is continuously performed.

Furthermore, in step S304, when it is determined that vehicle power is OFF (No), the control process proceeds to step S401. In step S401, it is determined whether a power system (battery) of the vehicle is being charged or whether the charging is completed. In step S401, when it is determined that the charging is in progress or is completed (Yes), the air conditioning control apparatus 50 determines that the vehicle is in a stop state (in a parking state), an occupant is not in the vehicle, and the battery of the vehicle is being charged or the charging is completed, the control process proceeds to step S402, and the air conditioning control apparatus 50 performs a "defrosting operation control" in which the external evaporator 32 is defrosted. During a continuous operation after the frost formation occurs, there is a possibility that the external evaporator 32 may be naturally defrosted. However, when the vehicle power is OFF after it is determined that the frost formation occurs, the "defrosting operation control" is certainly performed.

In contrast, when the power system (the battery) of the vehicle is not being charged or when the charging is not completed (No in step S401), the defrosting operation is temporarily interrupted.

Figure 12:
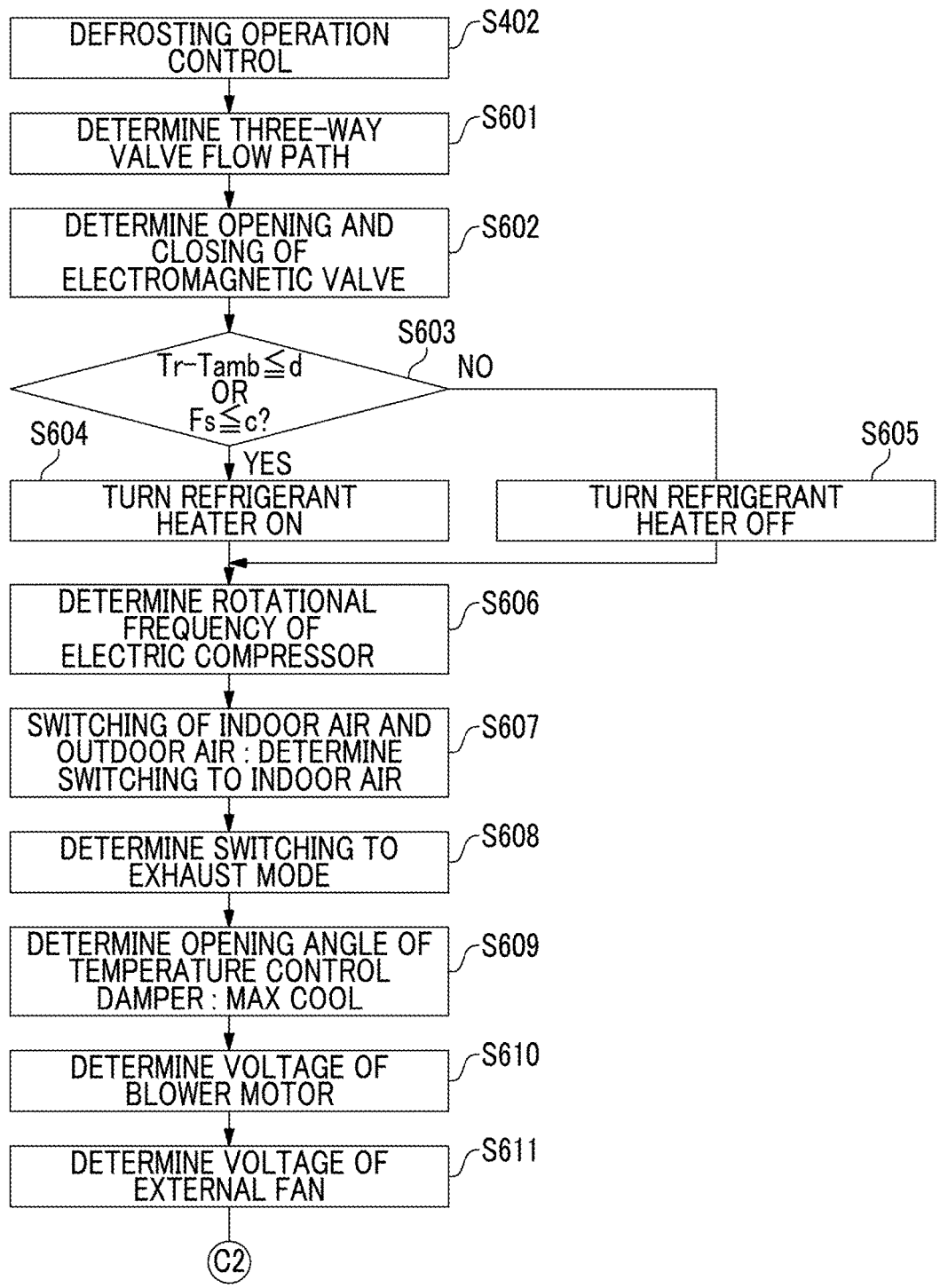
FIG. 12 is a flow chart illustrating a defrosting operation control of the control apparatus that illustrated in FIG. 7.

As illustrated in FIG. 12, in the "defrosting operation control" mode, in step S601, a flow path of the three-way switching valve 28 is determined to connect a circuit through which the refrigerant flows to the side of the external condenser 21. Subsequently, in step S602, opening and closing of the electromagnetic valves are determined, and the first electromagnetic valve 23 is open and the second electromagnetic valve 30 is closed. Accordingly, the refrigerating cycle 27 for a defrosting operation is set. Thereafter, the control process proceeds to step S603. In step S603, it is determined whether a difference between the detected value Tr of the inside air temperature sensor 53 and the detected value Tamb of the ambient air temperature sensor 54 is equal to or less than a set value d (Tr−Tamb≤d), or whether the detected value Fs of the frost sensor 57 is equal to or less than the set valve c (Fs≤c).

In step S603, when the determination is Yes, the control process proceeds to step S604, and the refrigerant heater 41 is ON. When the determination is No, the control process proceeds to step S605, and the refrigerant heater 41 is OFF. As such, when it is determined that a temperature in the cabin is low, sufficient heat cannot be expected to be absorbed in the internal evaporator 8, and the quantity of heat is not sufficient to perform the defrosting operation, the refrigerant circulating to the internal evaporator 8 can be heated by the refrigerant heater 41.

Subsequently, the air conditioning control apparatus 50 determines the following: the rotational frequency of the electric compressor 20 in step S606; a suction mode (the inside air circulation mode) switched by the inside and outside air switching damper 4 in step S607; a blowing mode switched by the blowing mode switching dampers 14, 15 and 16 in step S608; an opening angle (the MAX COOL position) of the temperature regulation damper 10 in step S609; a drive voltage of the blower 5 in step S610; and a drive voltage of the external fan 36 in step S611. The motors and the actuators 61 to 66 are driven. Accordingly, while heat dissipation in the internal condenser 9 is suppressed by setting the temperature regulation damper 10 to the maximum cooling position (the MAX COOL position), the defrosting operation in the inside air circulation mode is performed.

In the embodiment, the defrosting operation is performed in a state where the blowing mode is set to any one of the defroster mode, the face mode and the bi-level mode by the blowing mode switching dampers 14, 15 and 16. When the defrosting operation is performed in the inside air circulation mode, this prevents low-temperature air blown into the cabin from the foot blowing port 13 from being short-circuited to the suction port for inside air circulation in the proximity of the foot blowing port 13.

As illustrated in FIG. 12, when the "defrosting operation control" in steps S601 to S611 finishes, the control process proceeds to C2 (the step S403), and it is determined whether frost formation occurs. Similarly to the determination of the frost formation in step S303, it is determined whether the frost formation occurs based on whether a difference between the detected value T1 of the external evaporator refrigerant temperature sensor 58 and the detected value iamb of the ambient air temperature sensor 54 is equal to or greater than the set value a ((Tamb−T1≥a). When it is determined that the frost formation occurs (Yes), the control process proceeds to step S402, and the "defrosting operation control" is continuously performed. When the determination is No (the frost formation does not occur), the control process proceeds to step S403, and the defrosting operation finishes.

[Operation and Effect]

According to the air conditioning apparatus 1 for a vehicle of the embodiment, the following operational effects are accomplished.

At a low ambient air temperature, when it is determined that the external evaporator 32 is frosted, the refrigerant heater 41 operates. However, while the vehicle is travelling, the refrigerant does not flow into the external evaporator 32 to perform the defrosting operation. Accordingly, it is possible to prevent the defrosting operation from affecting a travelling distance of the vehicle.

At a low ambient air temperature, even though the external evaporator 32 is frosted, a flow of the refrigerant into the second heating circuit 34 is shut off, and an operation mode is switched to either the operation (the heating operation using the outside air (refer to FIG. 4)) of Case I or the operation (the dehumidification and heating operation using the inside air (refer to FIG. 5)) of Case II. For this reason, even though the external evaporator 32 is frosted, the heat pump heating operation is continuously performed as it is. Accordingly, it is possible to prevent interruption of the heating operation or loss in power consumption caused by carrying out the defrosting operation when the heating operation performed during the travelling of the vehicle.

In the embodiment, since the thermostatic expansion valves 31 and 42 are used, respectively, as an expansion valve for the external evaporator 32 and an expansion valve for the refrigerant heater 41, it is possible to reduce costs of an expansion valve control apparatus compared to an electronic expansion valve. In the present invention, it is allowed to use the electronic expansion valve or a shut-off type thermostatic expansion valve. Since it is easy for the valves to open widely, it is effective in preventing the refrigerant from stagnating in the valves.

The present invention is not limited to the embodiment, and can be appropriately modified insofar as the modifications do not depart from the spirit of the present invention. For example, in the embodiment, during the heat pump heating operation, even though the external evaporator 32 is frosted, the defrosting operation is not performed while the vehicle is travelling. However, when the external evaporator 32 is naturally defrosted while the vehicle is travelling, the heat pump heating operation using the external evaporator 32 may be restored.

The embodiment adopts three blowing mode switching dampers as the following: the defroster damper 14, the face damper 15 and the foot damper 16. However, the defroster damper 14 and the face damper 15 may be combined together into one damper, and the single combined damper and the foot damper 16 may be used. Furthermore, in the embodiment, the first electromagnetic valve 23 is provided on an inlet side of the first expansion valve 24. However, the first electromagnetic valve 23 and the first expansion valve 24 may be combined together into a single thermostatic automatic expansion valve with an electromagnetic opening and closing valve integrated.

Furthermore, in the embodiment, the internal evaporator and the internal condenser are independently provided, but are allowed to be integrated in the present invention.

REFERENCE SIGNS LIST

1 air conditioning apparatus for a vehicle
2 HVAC unit
3 heat pump cycle
8 internal evaporator
9 internal condenser
20 electric compressor
21 external condenser
23 first electromagnetic valve
24 first expansion valve
26 refrigerant pipe
26A discharge pipe
26B three-way valve inlet refrigerant pipe
260 refrigerant pipe
26D receiver outlet refrigerant pipe
26D refrigerant pipe
26E suction pipe
26F refrigerant pipe
27 refrigerating cycle
29 first heating circuit
30 second electromagnetic valve
31 first thermostatic expansion valve
32 external evaporator
34 second heating circuit
35 heat pump cycle
40 internal heat exchanger
41 refrigerant heater
42 second thermostatic expansion valve
50 air conditioning control apparatus

The invention claimed is:

1. A heat pump type air conditioning apparatus for a vehicle in which an operation mode is switched for an operation between a cooling operation in which a refrigerant discharged from a compressor is subject to heat exchange in an external condenser, and then is depressurized and supplied to an internal evaporator and a heating operation in which the refrigerant discharged from the compressor is subject to heat exchange in an internal condenser, and then is depressurized and supplied to an external evaporator, the apparatus comprising:

the external evaporator provided as a component different from the external condenser,
a refrigerant heater that is provided between the internal evaporator and a suction side of the compressor to be in parallel with the external evaporator, the refrigerant heater heats the refrigerant which is suctioned into the compressor; and
a control apparatus that determines whether the external evaporator is frosted,
wherein the heat pump type air conditioning apparatus is configured to perform a defrosting operation, when the control apparatus determines that the external evaporator is frosted during the heating operation, said defrosting operation including stopping a supply of the refrigerant subject to the heat exchange in the internal condenser to the external evaporator, supplying the refrigerant discharged from the compressor to the external condenser via the internal condenser, and then supplying the refrigerant to the refrigerant heater via the internal evaporator, heating the refrigerant and then, suctioning the heated refrigerant into the compressor.

2. The air conditioning apparatus for a vehicle according to claim 1, further comprising:
a first thermostatic expansion valve that is provided between the internal condenser and the external evaporator; and
a second thermostatic expansion valve that is provided between the internal condenser and the refrigerant heater,
wherein opening angles of the first and the second thermostatic expansion valves are controlled in conjunction with an operation of the refrigerant heater and thus, a flow path of the refrigerant is specified.

3. The air conditioning apparatus for a vehicle according to claim 2,
wherein the second thermostatic expansion valve includes a first passage with a pressure reduction mechanism and a second passage without a pressure reduction mechanism, and
wherein the refrigerant flowing out of the refrigerant heater is suctioned into the compressor via the second passage.

4. The air conditioning apparatus for a vehicle according to claim 2,
wherein while the frost formation determination unit determines that the external evaporator is not frosted during the heating operation,
a heating operation is performed in which the refrigerant discharged from the compressor dissipates heat in the internal condenser, is depressurized, absorbs heat in the external evaporator, and then is suctioned into the compressor, and
wherein while the frost formation determination unit determines that the external evaporator is frosted during the heating operation,
a dehumidification and heating operation is performed in an inside air circulation mode in which the refrigerant discharged from the compressor dissipates heat in the internal condenser, is depressurized, absorbs heat in the internal evaporator, is heated in the refrigerant heater, and then is suctioned into the compressor, or
a heating operation is performed in an outside air introduction mode in which the refrigerant discharged from the compressor dissipates heat in the internal condenser, is heated in the refrigerant heater that is a heat source, and then is suctioned into the compressor.

5. The air conditioning apparatus for a vehicle according to claim 1,
wherein while the control apparatus determines that the external evaporator is not frosted during the heating operation,
a heating operation is performed in which the refrigerant discharged from the compressor dissipates heat in the internal condenser, is depressurized, absorbs heat in the external evaporator, and then is suctioned into the compressor, and
wherein while the control apparatus determines that the external evaporator is frosted during the heating operation,
a dehumidification and heating operation is performed in an inside air circulation mode in which the refrigerant discharged from the compressor dissipates heat in the internal condenser, is depressurized, absorbs heat in the internal evaporator, is heated in the refrigerant heater, and then is suctioned into the compressor, or
a heating operation is performed in an outside air introduction mode in which the refrigerant discharged from the compressor dissipates heat in the internal condenser, is heated in the refrigerant heater that is a heat source, and then is suctioned into the compressor.

6. The air conditioning apparatus for a vehicle according to claim 5, wherein, in the heating operation in the outside air introduction mode, the refrigerant heated in the refrigerant heater is not supplied to either one of the external evaporator and the external condenser.

7. The air conditioning apparatus for a vehicle according to claim 1, wherein the refrigerant heater includes an electric sheathed heater or an electric heater using a positive temperature coefficient element.

8. The air conditioning apparatus for a vehicle according to claim 1, further comprising an internal heat exchanger that is provided between the suction side of the compressor and an outlet side of a receiver, wherein the internal heat exchanger exchanges heat between a refrigerant flowing through the outlet side of the receiver and the refrigerant flowing through the suction side of the compressor.

9. The air conditioning apparatus for a vehicle according to claim 1, wherein the apparatus is configured such that the refrigerant does not flow into the internal evaporator and the internal condenser successively during the heating operation.

10. The air conditioning apparatus for a vehicle according to claim 1,
wherein when it is determined that the external evaporator is frosted,
the heat pump type air conditioning apparatus is configured to perform the defrosting operation of the external evaporator in a state where the vehicle stops, and an occupant is not in the vehicle, and while a battery of the vehicle is being charged or when the battery has a spare capacity.

11. The air conditioning apparatus for a vehicle according to claim 1, the heat pump type air conditioning apparatus is configured to determine that the vehicle stops when the vehicle electric power is OFF.

* * * * *